United States Patent
Park et al.

(10) Patent No.: US 12,530,187 B2
(45) Date of Patent: Jan. 20, 2026

(54) VEHICLE CONTROL DEVICE AND A SYSTEM INCLUDING THE SAME

(71) Applicants: HYUNDAI MOTOR COMPANY, Seoul (KR); KIA CORPORATION, Seoul (KR)

(72) Inventors: Yoon Ki Park, Seoul (KR); Myeong Gyu Jeong, Hanam-si (KR); Hak Jun Kim, Goyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 131 days.

(21) Appl. No.: 18/633,876

(22) Filed: Apr. 12, 2024

(65) Prior Publication Data

US 2025/0190203 A1    Jun. 12, 2025

(30) Foreign Application Priority Data

Dec. 11, 2023  (KR) .................. 10-2023-0179095

(51) Int. Cl.
*G06F 8/65* (2018.01)
*H04L 9/40* (2022.01)
*B60R 16/023* (2006.01)

(52) U.S. Cl.
CPC ............ *G06F 8/65* (2013.01); *H04L 63/0823* (2013.01); *B60R 16/0231* (2013.01)

(58) Field of Classification Search
CPC ... G06F 8/65; G06F 8/71; G06F 21/45; H04L 63/0823; B60R 16/0231; B60R 16/02
See application file for complete search history.

(56) References Cited

U.S. PATENT DOCUMENTS

| | | | |
|---|---|---|---|
| 10,802,481 B1 * | 10/2020 | Menon ..................... | G08G 5/26 |
| 11,907,702 B2 | 2/2024 | Cho | |
| 12,258,027 B1 * | 3/2025 | Le Henaff ................. | G06F 8/65 |
| 2017/0242679 A1 | 8/2017 | Sangameswaran | |

(Continued)

FOREIGN PATENT DOCUMENTS

| | | |
|---|---|---|
| CN | 110278543 A | 9/2019 |
| CN | 113766490 A | 12/2021 |

(Continued)

*Primary Examiner* — Michael Won
(74) *Attorney, Agent, or Firm* — Lempia Summerfield Katz LLC

(57) ABSTRACT

A vehicle control device and a system including the same are provided. The vehicle control device includes a processor, a memory, and a plurality of controller. The processor identifies first version information indicating a version of each of the plurality of controllers. The processor transmits the first version information to a first external electronic device for updating a vehicle. The processor receives a list of first vehicle services available in the vehicle from a second external electronic device, which receives second version information identified by the first external electronic device based on the first version information. The second version information indicates a version of the vehicle. The processor activates at least one second vehicle service among the first vehicle services in the list received from the second external electronic device. The processor controls each of the plurality of controllers, based on the activated at least one second vehicle service.

18 Claims, 12 Drawing Sheets

(56) References Cited

U.S. PATENT DOCUMENTS

| | | | |
|---|---|---|---|
| 2020/0174779 A1* | 6/2020 | David | G06F 8/654 |
| 2022/0222054 A1 | 7/2022 | Sakai | |
| 2022/0222055 A1 | 7/2022 | Sakai | |
| 2022/0391191 A1* | 12/2022 | Cho | H04W 8/245 |
| 2023/0004376 A1* | 1/2023 | Ishikawa | G06F 8/61 |
| 2023/0068491 A1 | 3/2023 | Ko | |
| 2024/0176611 A1* | 5/2024 | Oh | G06F 8/65 |
| 2024/0192944 A1* | 6/2024 | Kim | G06F 21/34 |
| 2024/0394036 A1* | 11/2024 | Babayan | H04L 67/12 |
| 2024/0403023 A1* | 12/2024 | Cosentino | G06F 8/65 |

FOREIGN PATENT DOCUMENTS

| | | |
|---|---|---|
| CN | 115396309 A | 11/2022 |
| JP | 2022109039 A | 7/2022 |
| KR | 20220122411 A | 9/2022 |
| KR | 20220165059 A | 12/2022 |
| KR | 20230015199 A | 1/2023 |

\* cited by examiner

VEHICLE CONTROL DEVICE AND A SYSTEM INCLUDING THE SAME

CROSS-REFERENCE TO RELATED APPLICATION

This application claims the benefit of and priority to Korean Patent Application No. 10-2023-0179095, filed in the Korean Intellectual Property Office on Dec. 11, 2023, the entire contents of which are incorporated herein by reference.

TECHNICAL FIELD

The present disclosure relates to a vehicle control device and a system including the same, and more particularly, relates to technologies for updating a vehicle after the vehicle is released.

BACKGROUND

An over-the-air (OTA) service may allow a user to manage his or her vehicle without visiting a garage by updating software of a controller included in the vehicle using an OTA server. The OTA service has been used and is a technology for wirelessly updating software of the vehicle. The OTA service is a method for determining a vehicle system state as a vehicle system version. When a function available in the vehicle is not developed at a time point when the vehicle is mass-produced, a method to use the function by means of the OTA service is emerging after the vehicle is mass-produced. However, when a function, which is not matched with the vehicle system version is activated, an error may occur. Thus, there may be a need for providing a method for installing a function in a vehicle of a specified or more updated version, using a vehicle system version obtained by means of the OTA service. The above information disclosed in this Background section is only to enhance understanding of the background of the present disclosure. Therefore, the Background section may contain information that does not form the prior art that is already known to a person of ordinary skill in the art.

SUMMARY

The present disclosure has been made to solve the abovementioned problems occurring in the prior art while advantages achieved by the prior art are maintained intact.

An aspect of the present disclosure provides a vehicle control device for providing a vehicle service to a released vehicle. Another aspect of the present disclosure provides a system including the same.

Another aspect of the present disclosure provides a vehicle control device for providing a vehicle service matched with a version of a vehicle. Another aspect of the present disclosure provides a system including the same.

Another aspect of the present disclosure provides a vehicle control device for identifying a supportable minimum version to match a vehicle service with a version of a vehicle. Another aspect of the present disclosure provides a system including the same.

The technical problems to be solved by the present disclosure are not limited to the aforementioned problems. Any other technical problems not mentioned herein should be more clearly understood from the following description by those having ordinary skill in the art to which the present disclosure pertains.

According to an aspect of the present disclosure, a vehicle control device may include a processor, a memory, and a plurality of controllers. The processor may be configured to identify first version information indicating a version of each of the plurality of controllers. The processor may also be configured to transmit the first version information to a first external electronic device for updating a vehicle. The processor may also be configured to receive a list of first vehicle services available in the vehicle from a second external electronic device that is configured to receive second version information identified by the first external electronic device based on the first version information. The second version information may indicate a version of the vehicle. The processor may also be configured to activate at least one second vehicle service among the first vehicle services in the list received from the second external electronic device. The processor may also be configured to control each of the plurality of controllers, based on the activated at least one second vehicle service.

In an embodiment, the processor may also be configured to activate the at least one second vehicle service, based on an authentication certificate corresponding to the at least one second vehicle service, obtained from a third external electronic device. The third external electronic device interworks with the second external electronic device and distributes authentication certificates for the first vehicle services.

In an embodiment, the processor may also be configured to manage the authentication certificate, using a first controller associated with the at least one second vehicle service among the plurality of controllers, based on the obtained authentication certificate.

In an embodiment, the processor may also be configured to control a second controller that is configured to provide the at least one second vehicle service together with the first controller, by means of the first controller that is configured to manage the authentication certificate, in response to an input for using the at least one second vehicle service.

In an embodiment, the processor may also be configured to identify the first version information indicating the version of each of the plurality of controllers, after the vehicle is ignited.

In an embodiment, the first vehicle services may include a service corresponding to the second version information and not activated in the vehicle.

In an embodiment, the processor may also be configured to display the list of the first vehicle services based on execution of a store application interworking with the second external electronic device. The processor may also be configured to activate the at least one second vehicle service, in response to an input for the at least one second vehicle service among the first vehicle services, based on the displayed list.

In an embodiment, the processor may also be configured to obtain time information indicating a time interval when the at least one second vehicle service is available, when activating the at least one second vehicle service. The processor may also be configured to control each of the plurality of controllers during the time interval to activate the at least one second vehicle service.

In an embodiment, the processor may also be configured to update the version of the vehicle to another version indicating third version information different from the second version information by means of the first external electronic device, when downloading at least one fourth vehicle service among third vehicle services corresponding to the third version information. The processor may also be configured to activate the at least one fourth vehicle service, after the version of the vehicle is updated to the third version information.

In an embodiment, the processor may also be configured to perform an update for activating the at least one fourth vehicle service for the plurality of controllers, based on the third version information received from the first external electronic device.

According to another aspect of the present disclosure, a vehicle control system may include a vehicle control device that controls a plurality of controllers. The vehicle control system may also include a first external electronic device that updates a vehicle including the vehicle control device. The vehicle control system may also include a second external electronic device that manages a plurality of vehicle services. The vehicle control device may be configured to identify first version information indicating a version of each of the plurality of controllers and transmit the first version information to the first external electronic device. The first external electronic device may also be configured to obtain second version information indicating a version of the vehicle using the first version information received from the vehicle control device. The first external electronic device may also be configured to transmit the second version information to at least one of the vehicle control device, the second external electronic device, or any combination thereof. The second external electronic device may also be configured to transmit first vehicle services available in the vehicle among the plurality of vehicle services to the vehicle control device, using the second version information received from the first external electronic device.

In an embodiment, the vehicle control device may also be configured to activate at least one second vehicle service among the first vehicle services available in the vehicle, based on the first vehicle services available in the vehicle received from the second external electronic device. The vehicle control device may also be configured to execute the at least one second vehicle service, using a controller associated with the at least one second vehicle service among the plurality of controllers, in response to an input for executing the activated at least one second vehicle service.

In an embodiment, the second external electronic device may also be configured to transmit third vehicle services corresponding to third version information distinct to the second version information among the plurality of vehicle services to the vehicle control device. The vehicle control device may also be configured to activate at least one fourth vehicle service among the third vehicle services. The first external electronic device may also be configured to update a version of the vehicle to another version corresponding to the third version information to activate the at least one fourth vehicle service in the vehicle.

In an embodiment, the vehicle control system may further include a third external electronic device that manages authentication certificates respectively corresponding to the plurality of vehicle services. The third external electronic device may be configured to interwork with the second external electronic device to transmit an authentication certificate corresponding to the at least one second vehicle service to the vehicle control device. The vehicle control device may also be configured to activate the at least one second vehicle service in the vehicle, based on the authentication certificate received from the third external electronic device.

In an embodiment, the vehicle control system may further include a fourth external electronic device that generates the authentication certificates. The third external electronic device may also be configured to request the authentication certificate from the fourth external electronic device. The third external electronic device may also be configured to transmit the authentication certificate to the vehicle control device, based on the authentication certificate received from the fourth external electronic device. The vehicle control device may also be configured to manage the authentication certificate by means of a controller associated with the at least one second vehicle service among the plurality of controllers.

In an embodiment, the third external electronic device may also be configured to transmit the authentication certificate to the vehicle control device between the first external electronic device and the vehicle control device.

In an embodiment, the first external electronic device may also be configured to obtain the second version information by means of the first version information, based on a dataset indicating version information of the vehicle, the version information corresponding to the first version information indicating the version of each of the plurality of controllers.

In an embodiment, the second external electronic device may also be configured to transmit the first vehicle services available in the vehicle to the vehicle control device, based on execution of a store application by the vehicle control device. The store application may include a user interface for purchasing the plurality of vehicle services.

In an embodiment, the second external electronic device may also be configured to identify a minimum version of the vehicle for activating each of the plurality of vehicle services and transmit the first vehicle services available in the vehicle, using the second version information matched with the minimum version.

In an embodiment, the second external electronic device may also be configured to set a time interval for activating the first vehicle services available in the vehicle in the vehicle.

According to another aspect of the present disclosure, a computer-readable storage medium storing one or more programs including instructions, when executed by a processor of an electronic device, causing the electronic device to receive, from an external electronic device, second version information identified based on first version information indicating a version of each of a plurality of controllers included in a vehicle and indicating a version of the vehicle. The electronic device is also caused to identify a minimum version required to execute each of a plurality of vehicle services. The electronic device is also caused to identify first vehicle services corresponding to the minimum version matched with the second version information among the plurality of vehicle services.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
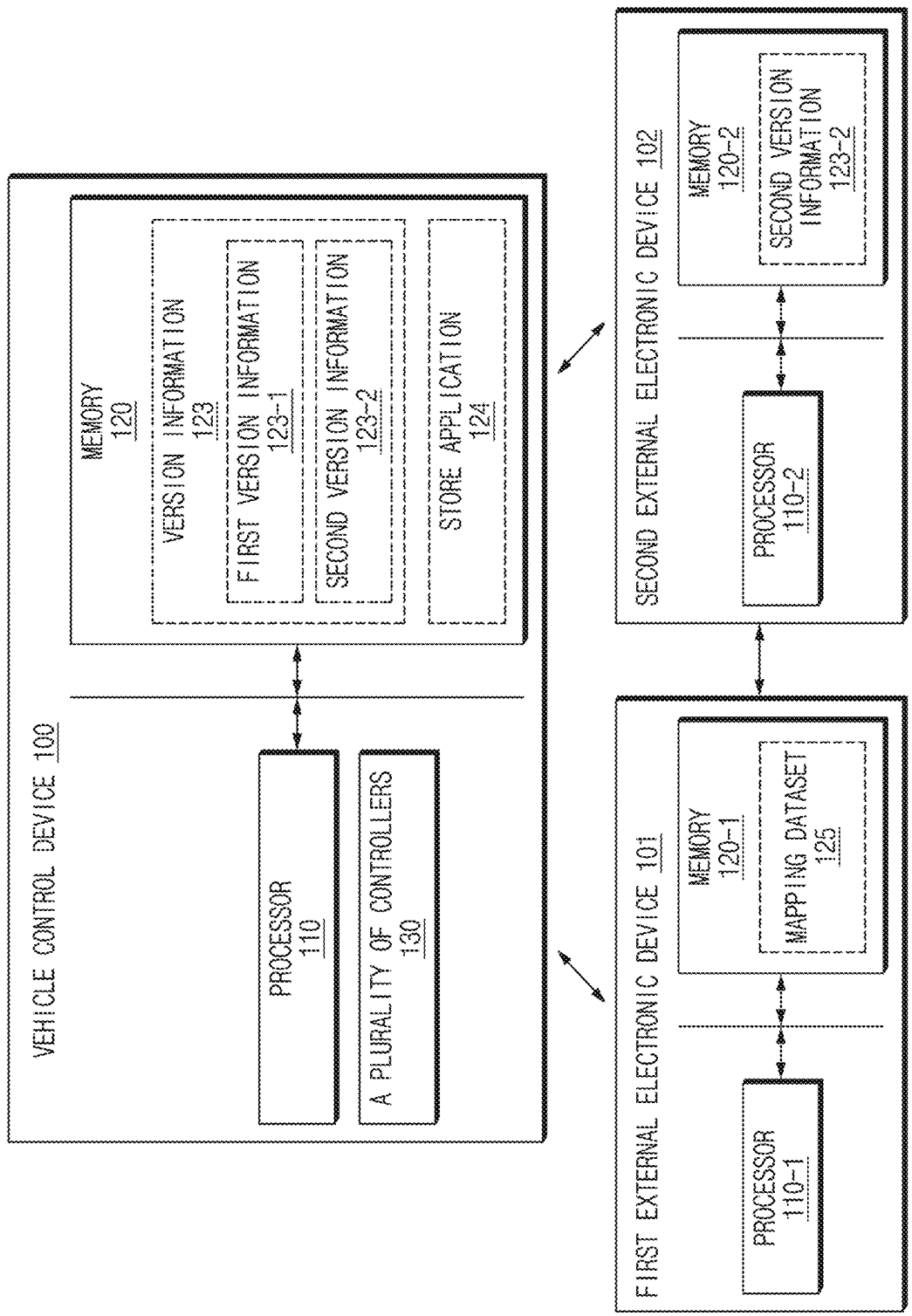
FIG. 1 illustrates an example of a block diagram associated with a vehicle control system according to an embodiment of the present disclosure.

Hereinafter, some embodiments of the present disclosure are be described in detail with reference to the drawings. In adding the reference numerals to the components of each drawing, it should be noted that the identical or equivalent components are designated by the identical numerals even when the components are displayed on other drawings. In addition, a detailed description of well-known features or functions has been omitted in order not to unnecessarily obscure the gist of the present disclosure.

In describing components of embodiments of the present disclosure, the terms first, second, A, B, (a), (b), and the like may be used herein. These terms are only used to distinguish one component from another component and are not intended to limit the corresponding components irrespective of the order or priority of the corresponding components. Furthermore, unless otherwise defined, all terms including technical and scientific terms used herein have the same meaning as being generally understood by those having ordinary skill in the art to which the present disclosure pertains. Such terms as those defined in a generally used dictionary should be interpreted as having meanings equal to the contextual meanings in the relevant field of art. The terms should not be interpreted as having ideal or excessively formal meanings unless clearly defined as having such in the present disclosure.

The terms "module", "controller", or the like used in describing various embodiments of the present disclosure may include a unit implemented with hardware, software, or firmware and may be interchangeably used with terms, for example, "logic," "logic block," "part," or "circuitry". A module or the like may be an integral part or may be a minimum unit or portion thereof, adapted to perform one or more functions. In an embodiment, the module may be implemented in the form of an application-specific integrated circuit (ASIC). According to various embodiments, operations performed by the module, the program, or another component may be carried out sequentially, in parallel, or repeatedly. Alternatively, one or more of the operations may be executed in a different order or omitted, or one or more other operations may be added.

Various embodiments of the present disclosure may be implemented as software (e.g., a program) including one or more instructions stored in a storage medium (e.g., an internal memory or an external memory) readable by a machine (e.g., a vehicle control device 100). For example, a processor (e.g., a processor 110) of the device (e.g., the vehicle control device 100) may invoke and execute at least one of the stored one or more instructions from the storage medium. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device and does not include a signal (e.g., an electromagnetic wave). However, this term does not differentiate between where data is semi-permanently stored in the storage medium and where data is temporarily stored in the storage medium. When a controller, module, component, device, element, or the like of the present disclosure is described as having a purpose or performing an operation, function, or the like, the controller, module, component, device, element, or the like should be considered herein as being "configured to" meet that purpose or to perform that operation or function. Each controller, module, component, device, element, and the like may separately embody or be included with a processor and a memory, such as a non-transitory computer readable media, as part of the apparatus.

Hereinafter, embodiments of the present disclosure are described in detail with reference to FIGS. 1-12.

FIG. 1 illustrates an example of a block diagram associated with a vehicle control system 105 according to an embodiment of the present disclosure. Referring to FIG. 1, the vehicle control system 105 according to an embodiment of the present disclosure may include a vehicle control device 100, a first external electronic device 101, and/or a second external electronic device 102. The vehicle control device 100 according to an embodiment of the present disclosure may establish a connection to the first external electronic device 101 and/or the second external electronic device 102 based on a wired network and/or a wireless network. For example, the wired network may include a network, such as the Internet, a local area network (LAN), a wide area network (WAN), an Ethernet for vehicle, a controller area network (CAN), a local interconnect network (LIN), FlexRay, or any combination thereof. For example, the wireless network may include a network, such as long term evolution (LTE), 5th generation new radio (5G NR), wireless fidelity (Wi-Fi), ZigBee, near field communication (NFC), Bluetooth, Bluetooth low-energy (BLE), or any combination thereof. Although the vehicle control device 100, the first external electronic device 101, and/or the second external electronic device 102 are/is directly connected to each other, they may be indirectly connected to each other through an intermediate node in a network.

Referring to FIG. 1, the vehicle control device 100 of the vehicle control system 105 according to an embodiment of the present disclosure may be implemented inside or outside a vehicle. Some components included in the vehicle control device 100 may be implemented inside or outside the vehicle. In this case, the vehicle control device 100 may be integrally configured with control units in the vehicle or may be implemented as a separate device to be connected to the control units of the vehicle by a separate connection means. Types of the pieces of hardware included in the vehicle control device 100 and/or the number of the pieces of hardware are/is limited to those shown in FIG. 1. For example, the vehicle control apparatus 100 may further include components, which are not shown in FIG. 1. As an example, the vehicle control device 100 may further include a communication circuit (or an interface) for establishing a communication link with external electronic devices in a wired or wireless manner. The vehicle control device 100 may receive a request for accessing a controller (e.g., at least one of the plurality of controllers 130) (or an authentication certificate required to access the plurality of controllers 130) from the external electronic devices, based on an established communication link with the external electronic devices in a wireless or wired manner through the communication circuit. The vehicle may include a software defined vehicle (SDV).

The vehicle control device 100 according to an embodiment may include at least one of a processor 110, a memory 120, or the plurality of controllers 130. The processor 110, the memory 120, and the plurality of controllers 130 may be electronically or operably coupled with each other by an electronical component including a communication bus. Hereinafter, pieces of hardware operably coupled with each other may mean that a direct connection or an indirect connection between the pieces of hardware is established in a wired or wireless manner. Thus, second hardware is controlled by first hardware among the pieces of hardware. The pieces of hardware are illustrated based on the different blocks, but an embodiment is not limited thereto. Some (e.g., at least some of the processor 110, the memory 120, or the communication circuit (not shown)) of the pieces of hardware of FIG. 1 may be included in a single integrated circuit, such as a system on a chip (SoC).

The processor 110 of the vehicle control device 100 according to an embodiment may include hardware for processing data based on one or more instructions. The hardware for processing the data may include, for example, an arithmetic and logic unit (ALU), a floating point unit (FPU), a field programmable gate array (FPGA), a central processing unit (CPU), and/or an application processor (AP). The number of the processors 110 may be one or more in number. For example, the processor 110 may have a structure of a multi-core processor such as a dual core, a quad core, or a hexa core. Operations below may be performed by the processor 110. In an embodiment, the processor 110 may establish a communication link for transmitting data between the plurality of controllers 130. The processor 110 may be referred to as a central communication unit (CCU) in terms of being configured to establish the communication link between the plurality of controllers 130 or manage the plurality of controllers 130.

According to an embodiment, the memory 120 of the vehicle control device 100 may include a hardware component for storing data and/or an instruction input and/or output from the processor 110. The memory 120 may include, for example, a volatile memory, such as a random-access memory (RAM), and/or a non-volatile memory, such as a read-only memory (ROM). The volatile memory may include at least one of, for example, a dynamic RAM (DRAM), a static RAM (SRAM), a cache RAM, or a pseudo SRAM (PSRAM). The non-volatile memory may include at least one of, for example, a programmable ROM (PROM), an erasable PROM (EPROM), an electrically erasable PROM (EEPROM), a flash memory, a hard disk, a compact disc, a solid state drive (SSD), or an embedded multi-media card (eMMC).

One or more instructions indicating calculation and/or an operation to be performed for data by the processor 110 may be stored in the memory 120 of the vehicle control device 100 according to an embodiment. A set of the one or more instructions may be referred to as firmware, an operating system, a process, a routine, a sub-routine, and/or an application. For example, when a set of a plurality of instructions distributed in the form of an operating system, firmware, a driver, and/or an application is executed, the vehicle control device 100 and/or the processor 110 may perform at least one of operations of FIG. 4. Hereinafter, software, in the form of an operating system, firmware, a driver, and/or an application and installed in the vehicle control device 100, may mean that one or more instructions provided in the form of software are stored in the memory 120 of the vehicle control device 100. In other words, one or more applications are stored in a format executable by the processor 110 of the vehicle control device 100 (e.g., as a file with an extension specified by an operating system of the vehicle control device 100).

In an embodiment, after starting a vehicle (or when the vehicle is key on), the vehicle control device 100 may obtain first version information 123-1 indicating a version of each of the plurality of controllers 130. The first version information 123-1 may include a software version (or a hardware version) of each of the plurality of controllers 130, an identification number of each of the plurality of controllers 130, and a supplier identification number of each of the plurality of controllers 130. The first version information 123-1 may indicate a combination of versions of the plurality of controllers 130. After transmitting the first version information 123-1 to the first external electronic device 101, the vehicle control device 100 according to an embodiment may obtain second version information 123-2 indicating a version of the vehicle (or a software version of a vehicle system) from the first external electronic device 101. The first version information 123-1 and the second version information 123-2 may be included in version information 123 of FIG. 1.

In an embodiment, a store application 124 may include a software application associated with a feature on demand (FoD). The vehicle control device 100 may activate a vehicle service performable by the vehicle control device 100, based on execution of the store application 124. The vehicle service may indicate a function capable of being performed using the vehicle. For example, the vehicle service may include a parking assistance function for supporting parking and/or a streaming plus for providing pieces of sound source content. The vehicle control device 100 may control a controller associated with the vehicle service among the plurality of controllers 130, based on an activated vehicle service. The vehicle control device 100 may change a function available in the produced vehicle, based on the execution of the store application 124. The vehicle control device 100 may activate or deactivate the vehicle service, without changing (or reprogramming) the plurality of controllers 130, using the store application 124.

In an embodiment, the plurality of controllers 130 may drive at least a part of the vehicle including the vehicle control device 100 according to an embodiment. For example, the plurality of controllers 130 may be referred to as electronic control units in terms of managing electronic devices in the vehicle. The electronic control unit may include an engine control unit, a transmission control unit (TCU), and/or electronic stability control (ESC), depending on a type of an electronic device controllable by the electronic control unit. The plurality of controllers 130 according to an embodiment may perform verification for an authentication certificate corresponding to the plurality of controllers 130 and indicating the vehicle service. Based on the completion of the verification, each of the plurality of controllers 130 may activate the vehicle service corresponding to the authentication certificate. The plurality of controllers 130 may be referred to as domain controllers in terms of controlling an electronical component in the vehicle.

In an embodiment, the first external electronic device 101 may include at least one of a processor 110-1 or a memory 120-1. The processor 110-1 and the memory 120-1 may be electronically or operably coupled with each other by an electronical component including a communication bus. Types of the pieces of hardware included in the first external electronic device 101 and/or the number of the pieces of hardware are/is not limited to those shown in FIG. 1. For example, the first external electronic device 101 may include only some of the pieces of hardware shown in FIG. 1. The processor 110-1 and the memory 120-1 included in the first external electronic device 101 may include a hardware part and/or a circuit corresponding to the processor 110 and the memory 120 of the vehicle control device 100. Hereinafter, to reduce the repetition, the description of hardware and/or software included in the first external electronic device 101 may be omitted within a range in which the hardware and/or the software are/is duplicated with the vehicle control device 100.

In an embodiment, the first external electronic device 101 may include a server for updating the vehicle. The first external electronic device 101 may wirelessly update the vehicle. The first external electronic device 101 may be referred to as an on-the-air (OTA) server in terms of wirelessly updating the vehicle. For example, the first external electronic device 101 and the vehicle control device 100 may wirelessly transmit and/or receive a signal, using an OTA protocol.

In an embodiment, the first external electronic device 101 may include a mapping dataset 125. The mapping dataset 125 may indicate the second version information 123-2 of the vehicle, which corresponds to the first version information 123-1 indicating the version of each of the plurality of controllers 130. The first external electronic device 101 may identify the second version information 123-2 based on receiving the first version information 123-1 from the vehicle control device 100, using the mapping dataset 125.

In an embodiment, the second external electronic device 102 may include at least one of a processor 110-2 or a memory 120-2. The processor 110-2 and the memory 120-2 may be electronically or operably coupled with each other by an electronical component including a communication bus. Types of the pieces of hardware included in the second external electronic device 102 and/or the number of the pieces of hardware are/is not limited to those shown in FIG. 1. For example, the second external electronic device 102 may include only some of the pieces of hardware shown in FIG. 1. The processor 110-2 and the memory 120-2 included in the second external electronic device 102 may include a hardware part and/or a circuit corresponding to the processor 110 and the memory 120 of the vehicle control device 100. Hereinafter, to reduce the repetition, the description of hardware and/or software included in the second external electronic device 102 may be omitted within a range in which the hardware and/or the software are/is duplicated with the vehicle control device 100.

In an embodiment, the second external electronic device 102 may include a server for managing the store application 124. The second external electronic device 102 may be referred to as an electronic device in terms of performing an operation for managing the store application 124. The second external electronic device 102 may be referred to as an FoD product store server in terms of providing a plurality of vehicle services (or a plurality of functions) available in the vehicle.

In an embodiment, the second external electronic device 102 may receive the second version information 123-2 from the first external electronic device 101. The second external electronic device 102 may identify a vehicle service mapped to the second version information 123-2. The second external electronic device 102 may transmit the vehicle service mapped to the second version information 123-2 to the vehicle control device 100.

As described above, the vehicle control system 105 according to an embodiment may activate the vehicle service available in the produced vehicle, without reprogramming the plurality of controllers 130. The vehicle control system 105 may provide a vehicle service developed after the vehicle is produced, using the first external electronic device 101 or the second external electronic device 102. The vehicle control system 105 may provide a user who uses the vehicle with an environment capable of customizing a vehicle service (or a vehicle option).

Hereinafter, a description is given in detail of an operation of activating the vehicle service by means of the first external electronic device 101 and/or the second external electronic device 102 in the vehicle control device 100 with reference to FIG. 2.

Figure 2:
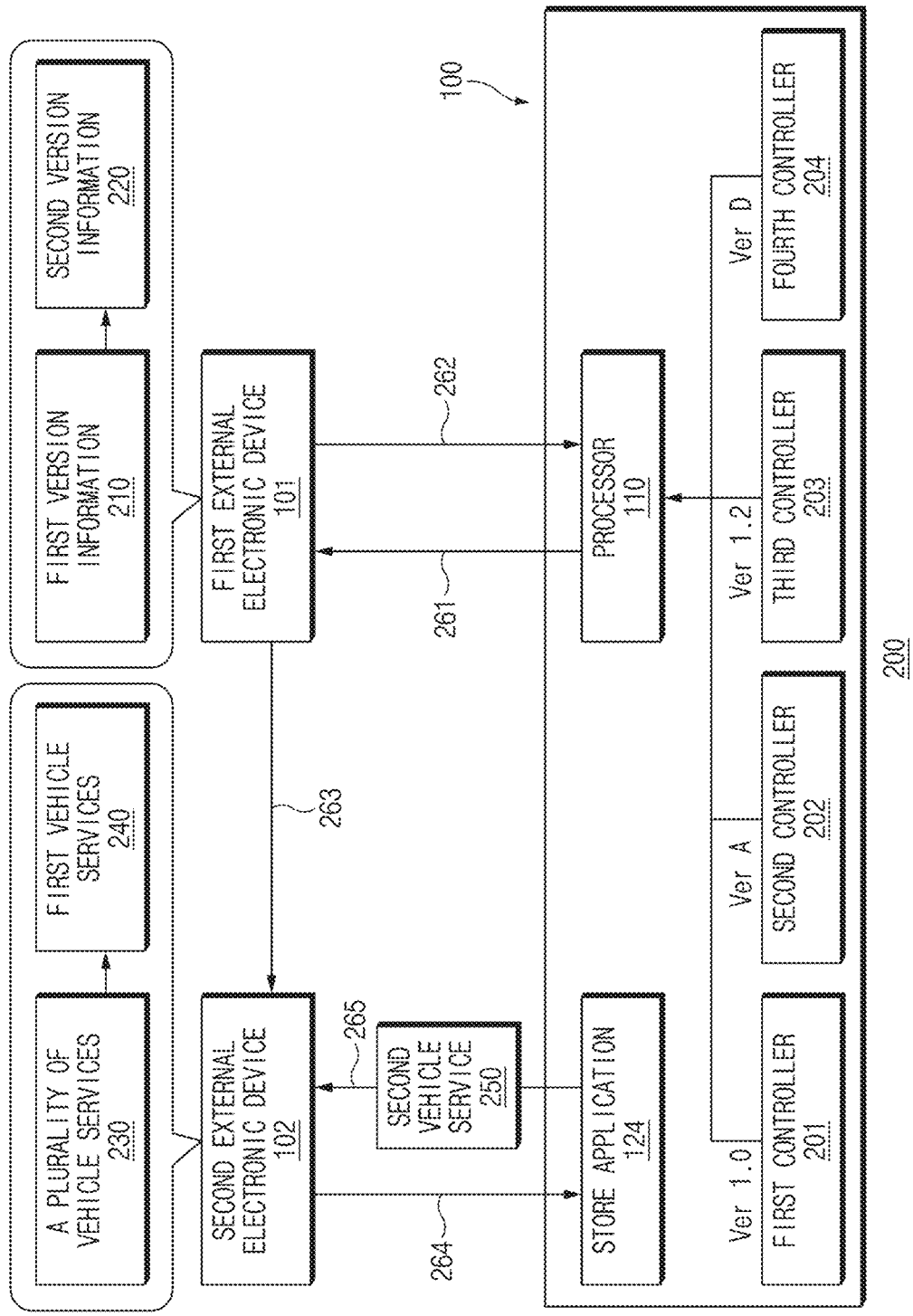
FIG. 2 illustrates an example for describing an operation of activating a vehicle system in a vehicle control device according to an embodiment of the present disclosure.

FIG. 2 illustrates an example 200 for describing an operation of activating a vehicle system in a vehicle control device according to an embodiment of the present disclosure. The example 200 of FIG. 2 may include a vehicle control system 105 of FIG. 1.

Referring to FIG. 2, after starting a vehicle (or after the vehicle ignition is turned on), a vehicle control device 100 according to an embodiment may identify first version information 210 indicating a version of each of a plurality of controllers (e.g., a plurality of controllers 130 of FIG. 1). For example, a first controller 201, a second controller 202, a third controller 203, and/or a fourth controller 204 may be included in the plurality of controllers 130 of FIG. 1. For example, the vehicle control device 100 may identify a version (e.g., Ver 1.0) of the first controller 201. The vehicle control device 100 may identify a version (Ver A) of the second controller 202. The vehicle control device 100 may identify a version (Ver 1.2) of the third controller 203. The vehicle control device 100 may identify a version (Ver D) of the fourth controller 204. The vehicle control device 100 may identify the first version information 210 indicating the version of each of the first to fourth controllers 201 to 204. For example, the first version information 210 may indicate a combination of the versions of the first to fourth controllers 201 to 204. The first version information 210 may be referred to first version information 123-1 of FIG. 1.

The vehicle control device 100 according to an embodiment may transmit the first version information 210 to a first external electronic device 101 for updating a vehicle. For example, the vehicle control device 100 may wirelessly transmit a signal 261 indicating the first version information 210 to the first external electronic device 101 through a communication circuit.

In an embodiment, the first external electronic device 101 may obtain second version information 220 indicating a version of the vehicle using the first version information 210 received from the vehicle control device 100. The version of the vehicle may refer to at least one of a software version, a hardware version, a firmware version, or a map data version of a system of the vehicle. The system of the vehicle may indicate an operating system for controlling the vehicle. However, it is not limited thereto. As an example, the version of the vehicle may be used to identify a state of the vehicle based on the version of each of the plurality of controllers.

In an embodiment, the first external electronic device 101 may obtain the second version information 220 by means of the first version information 210, based on a dataset (e.g., a mapping dataset 125 of FIG. 1) indicating version information of the vehicle, which corresponds to version information indicating the version of each of the plurality of controllers (e.g., the first to fourth controllers 201 to 204). The second version information 220 may be referred to second version information 123-2 of FIG. 1.

In an embodiment, the first external electronic device 101 may transmit the second version information 220 to each of at least one of the vehicle control device 100, a second external electronic device 102, or any combination thereof. For example, the first external electronic device 101 may transmit the second version information 220 to the vehicle control device 100. The first external electronic device 101 may transmit a signal 262 indicating the second version information 220 to the vehicle control device 100. In an embodiment, the vehicle control device 100 may display a text object indicating the second version information 220 on a display of the vehicle control device 100, based on the received second version information 220 (or the signal 262). As an example, the display may be used to provide a vehicle infotainment system. The display may include audio, video, navigation (AVN). The vehicle control device 100 may notify a user of the second version information 220, based on the displayed text object indicating the second version information 220. However, it is not limited thereto. As an example, the vehicle control device 100 may notify the user of the second version information 220, based on the transmitted second version information 220 to a user terminal (e.g., a smartphone).

In an embodiment, the first external electronic device 101 may transmit a signal 263 indicating the second version information 220 to the second external electronic device 102. The second external electronic device 102 may identify first vehicle services 240 corresponding to the second version information 220 among a plurality of vehicle services 230. For example, the first vehicle services 240 may include a service, which corresponds to (or is matched with) the second version information 220 and is not activated in a vehicle (e.g., a vehicle including the vehicle control device 100). The second external electronic device 102 may identify the first vehicle services 240 available in the vehicle (or purchasable by a user of the vehicle) among the plurality of vehicle services 230, using the second version information 220.

In an embodiment, the second external electronic device 102 may identify a minimum version of the vehicle for activating each of the plurality of vehicle services 230. The minimum version of the vehicle for activating each of the plurality of vehicle services 230 may be set, when each of the plurality of vehicle services 230 is registered in the second external electronic device 102. The minimum version of the vehicle for activating each of the plurality of vehicle services 230 may be set by another external electronic device (or a service provider), which distributes the plurality of vehicle services 230. The other external electronic device may be associated with at least one of the plurality of controllers.

For example, the minimum version of the vehicle for activating each of the plurality of vehicle services 230 may indicate a minimum specification required to execute each of the plurality of vehicle services 230. In an embodiment, the second external electronic device 102 may identify the first vehicle services 240 available in the vehicle, using the second version information 220 matched with the minimum version. The second external electronic device 102 may transmit a list of the first vehicle services 240 to the vehicle control device 100.

The vehicle control device 100 according to an embodiment may receive the list of the first vehicle services 240 available in the vehicle, from the second external electronic device 102, which receives the second version information 220. The second version information 220 is identified by the first external electronic device 101 based on the first version information 210 and indicates the version of the vehicle. For example, the vehicle control device 100 may display the list of the first vehicle services 240, based on execution of a store application 124 interworking with the second external electronic device 102.

In an embodiment, the second external electronic device 102 may transmit the first vehicle services 240 available in the vehicle to the vehicle control device 100, based on the execution of the store application 124 by the vehicle control device 100. The second external electronic device 102 may transmit a signal 264 indicating the list of the first vehicle services 240 to the vehicle control device 100, based on the execution of the store application 124 by the vehicle control device 100. For example, the store application 124 may include a user interface for purchasing (or lending) the plurality of vehicle services 230. The plurality of vehicle services 230 may be referred to as products capable of being obtained by means of the store application 124 in terms of being purchasable.

The vehicle control device 100 according to an embodiment may obtain an input for at least one second vehicle service 250 among the first vehicle services 240, based on displaying the list. The vehicle control device 100 may activate the at least one second vehicle service 250 in response to the input. The vehicle control device 100 may control each of the plurality of controllers, based on the activated at least one second vehicle service 250. For example, the vehicle control device 100 may control the first controller 201 and the second controller 202 to activate the at least one second vehicle service 250. In response to the input for executing the activated at least one second vehicle service 250, the vehicle control device 100 may execute the at least one second vehicle service 250, using a controller (e.g., the first controller 201 and/or the second controller 202) associated with the at least one second vehicle service 250 among the plurality of controllers.

Figure 3:
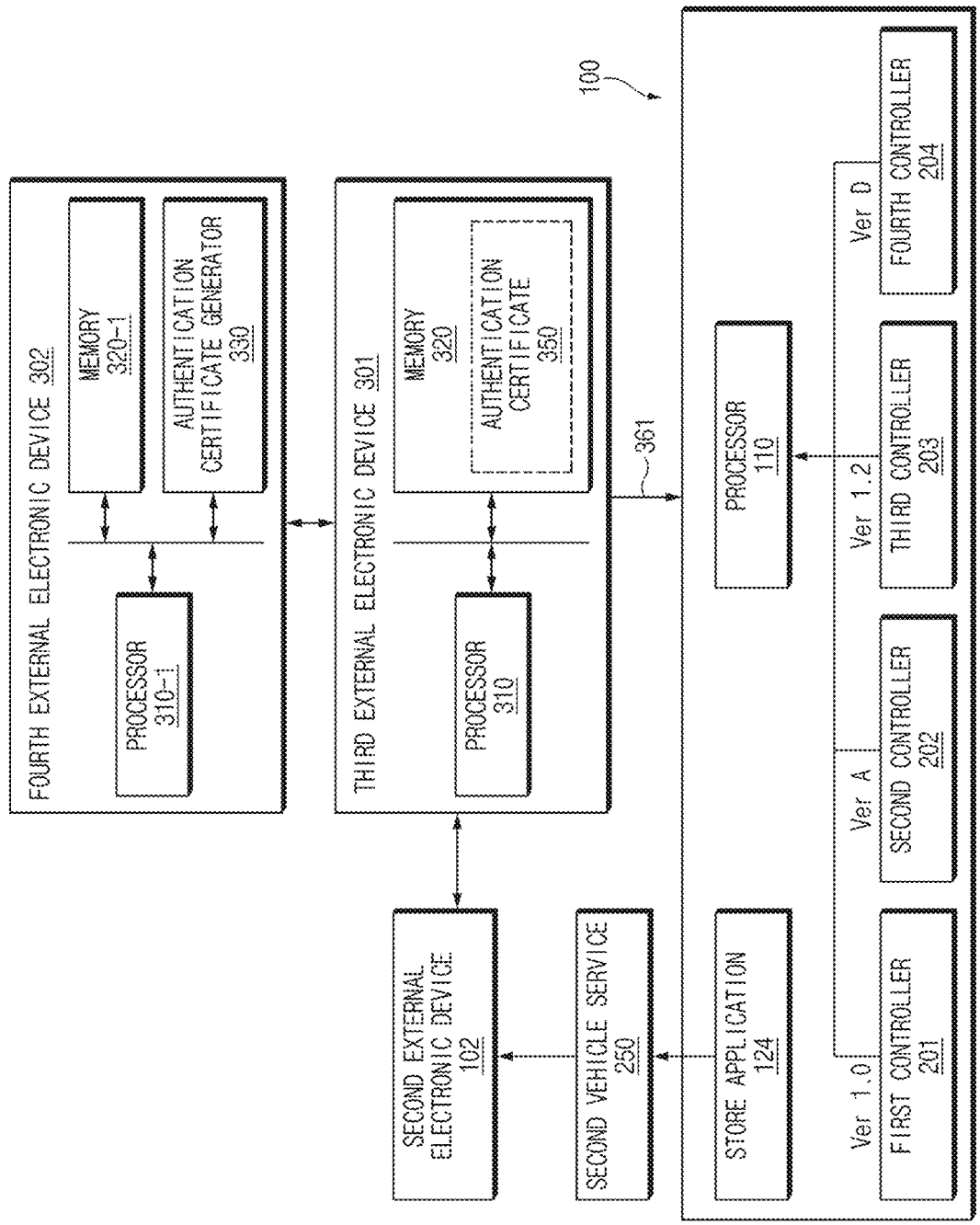
FIG. 3 illustrates an example for describing an operation of obtaining an authentication certificate in a vehicle control device according to an embodiment of the present disclosure.

Based on an obtained input for the at least one second vehicle service 250 among the first vehicle services 240, the vehicle control device 100 according to an embodiment may transmit a signal 265 indicating the input to the second external electronic device 102. The second external electronic device 102 may transmit information for activating the at least one the second vehicle service 250 in the vehicle to the vehicle control device 100. However, it is not limited thereto. For example, the second external electronic device 102 may cause another external electronic device (e.g., a third external electronic device 301 of FIG. 3) to transmit an authentication certificate for activating the at least one second vehicle service 250 to the vehicle control device 100. FIG. 3 describes the operation of causing the other external electronic device to transmit the authentication certificate to the vehicle control device 100 in the second external electronic device 102.

In an embodiment, the second external electronic device 102 may set a time interval for activating the first vehicle services 240 available in the vehicle in the vehicle. The second external electronic device 102 may notify the user of the time interval by means of the store application 124. The vehicle control device 100 may guide the user to set a time (or a deadline) for using the vehicle service, using the store application 124. The vehicle control device 100 may, by using the using the store application 124, provide the user with a purchase service capable of permanently using the vehicle service and/or a rental service capable of using the vehicle service during a specified time interval.

For example, the second external electronic device 102 may receive an input for setting a time interval for activating the at least one second vehicle service 250 among the first vehicle services 240 in the vehicle from the vehicle control device 100. The second external electronic device 102 may set the time interval for activating the at least one second vehicle service 250, based on the received input. Thus, the second external electronic device 102 may transmit information for activating the at least one second vehicle service 250 to the vehicle control device 100.

When activating the at least one second vehicle service 250, the vehicle control device 100 according to an embodiment may obtain time information indicating a time interval when the at least one second vehicle service 250 is available. The vehicle control device 100 may control each of the plurality of controllers during the time interval to activate the at least one second vehicle service 250.

In an embodiment, the second external electronic device 102 may identify third vehicle services corresponding to third version information distinct to the second version information 220 among the plurality of vehicle services 230. The third version information may indicate a relatively higher version than the second version information 220. The third version information may indicate a version distributed (or released) after the second version information 220. For example, the second external electronic device 102 may transmit a list of the third vehicle services, independently of transmitting the first vehicle services 240 corresponding to the second version information 220 to the vehicle control device 100.

The vehicle control device 100 according to an embodiment may receive an input for activating at least one fourth vehicle service among the third vehicle services. The vehicle control device 100 may identify the third version information corresponding to the at least one fourth vehicle service. The vehicle control device 100 may perform an update from the second version information to the third version information by means of the first external electronic device 101. For example, when downloading (or activating) the at least one fourth vehicle service among the third vehicle services corresponding to the third version information, the vehicle control device 100 may update the version of the vehicle to another version indicating the third version information by means of the first external electronic device 101.

In an embodiment, the first external electronic device 101 may transmit, to the vehicle control device 100, update information for updating the version of the vehicle to the other version corresponding to the third version information. Thus, the at least one fourth vehicle service in the vehicle may be activated.

The vehicle control device 100 according to an embodiment may perform an update for activating the at least one fourth vehicle service for the plurality of controllers, based on the received third version information (or update information) from the first external electronic device 101. After being updated to the third version information, the vehicle control device 100 may activate the at least one fourth vehicle service. In other words, when activating a vehicle service, which does not correspond to the version of the vehicle, the vehicle control device 100 may update the version of the vehicle to a minimum version for activating the vehicle service and may then activate the vehicle service.

As described above, the vehicle control device 100 according to an embodiment may identify vehicle services mapped to the version of the vehicle, using the second external electronic device 102. The vehicle control device 100 may provide the user with vehicle services distributed after the vehicle is released, through the second external electronic device 102. The vehicle control device 100 may provide the user with a feature on demand (FoD) service capable of installing the vehicle service in the vehicle after the vehicle is released, through the second external electronic device 102. The vehicle control device 100 may install the vehicle service in the vehicle after the vehicle is released. Thus, the vehicle control device 100 may determine whether to activate a controller associated with the vehicle service.

FIG. 3 illustrates an example 300 for describing an operation of obtaining an authentication certificate in a vehicle control device according to an embodiment of the present disclosure. Referring to FIG. 3, a vehicle control system (e.g., a vehicle control system 105 of FIG. 1) according to an embodiment may further include a third external electronic device 301 and/or a fourth external electronic device 302.

In an embodiment, the third external electronic device 301 may include at least one of a processor 310 or a memory 320. The processor 310 and the memory 320 may be electronically or operably coupled with each other by an electronical component including a communication bus. Types of the pieces of hardware included in the third external electronic device 301 and/or the number of the pieces of hardware are/is not limited to those shown in FIG. 3. For example, the third external electronic device 301 may include only some of the pieces of hardware shown in FIG. 3. The processor 310 and the memory 320 included in the third external electronic device 301 may include a hardware part and/or a circuit corresponding to a processor 110 and a memory 120 of a vehicle control device 100 of FIG. 1. Hereinafter, to reduce the repetition, the description of hardware and/or software included in the third external electronic device 301 may be omitted within a range in which the hardware and/or the software are/is duplicated with the vehicle control device 100. In an embodiment, the third external electronic device 301 may distribute or manage authentication certificates interworking with a second external electronic device 102 and for first vehicle services (e.g., first vehicle services 240 of FIG. 2). For example, the third external electronic device 301 may interwork with the second external electronic device 102 to manage an authentication certificate corresponding to a controller associated with a vehicle service to be activated. The third external electronic device 301 may be referred to as an authentication certificate distribution server in terms of distributing or managing an authentication certificate.

In an embodiment, the memory 320 of the third external electronic device 301 may include an authentication certificate 350. The authentication certificate 350 may be used to activate a vehicle service. The vehicle control device 100 may access a plurality of controllers (e.g., a plurality of controllers 130 of FIG. 1) to perform an update for a vehicle service using the authentication certificate 350. The vehicle control device 100 may update a controller to activate a vehicle service, using an authentication certificate for the controller associated with the vehicle service.

For example, the vehicle control device 100 may control a first controller 201 and a second controller 202 to activate at least one second vehicle service 250 of FIG. 2. The vehicle control device 100 may receive a signal 361 indicating the authentication certificate 350 for updating the first controller 201 and the second controller 202 associated with the at least one second vehicle service 250 of FIG. 2 from the third external electronic device 301. The vehicle control device 100 may manage the authentication certificate 350, using the first controller 201 associated with the at least one second vehicle service, based on the obtained authentication certificate 350. The vehicle control device 100 may control the first controller 201 and the second controller 202, using the authentication certificate 350 managed using the first controller 201, to activate the at least one second vehicle service 250 of FIG. 2. The first controller 201 may be referred to as a main controller (or a master controller) in terms of managing the authentication certificate 350 for updating (or changing) the second controller 202. In this case, the second controller 202 may be referred to as a slave controller. However, it is not limited thereto.

In an embodiment, the fourth external electronic device 302 may include at least one of a processor 310-1 or a memory 320-1. The processor 310-1 and the memory 320-1 may be electronically or operably coupled with each other by an electronical component including a communication bus. Types of the pieces of hardware included in the fourth external electronic device 302 and/or the number of the pieces of hardware are/is not limited to those shown in FIG. 3. For example, the fourth external electronic device 302 may include only some of the pieces of hardware shown in FIG. 3. The processor 310-1 and the memory 320-1 included in the fourth external electronic device 302 may include a hardware part and/or a circuit corresponding to the processor 110 and the memory 120 of the vehicle control device 100 of FIG. 1. Hereinafter, to reduce the repetition, the description of hardware and/or software included in the fourth external electronic device 302 may be omitted within a range in which the hardware and/or the software are/is duplicated with the vehicle control device 100. In an embodiment, the fourth external electronic device 302 may interwork with the second external electronic device 102 (or the third external electronic device 301) to generate authentication certificates for first vehicle services (e.g., first vehicle services 240 of FIG. 2). The fourth external electronic device 302 may be referred to as an authentication certificate generation server in terms of generating an authentication certificate. The authentication certificate generation server may be associated with a vehicle manufacturer or a provider, which manufactures a controller. The authentication certificate generation server may be referred to as a certificate authority (CA).

The fourth external electronic device 302 according to an embodiment may include an authentication certificate generator 330. When receiving a request indicating the generation of the authentication certificate 350 from the third external electronic device 301, the fourth external electronic device 302 may generate the authentication certificate 350 by means of the authentication certificate generator 330. The fourth external electronic device 302 may transmit the generated authentication certificate 350 to the third external electronic device 301.

For example, the memory 320-1 of the fourth external electronic device 302 may include authentication information. In an embodiment, the authentication information may include information associated with a plurality of controllers (e.g., a plurality of controllers 130 of FIG. 1), which are at least temporarily connected to the vehicle control device 100. For example, the authentication information may include information indicating whether to grant access authority over the plurality of controllers. However, it is not limited thereto. As an example, the authentication information may include information indicating a type of an authentication certificate required to access the plurality of controllers. The fourth external electronic device 302 may generate an authentication certificate corresponding to each of the plurality of controllers, using the authentication information.

The vehicle control device 100 according to an embodiment may transmit a signal for activating the at least one second vehicle service 250 by means of the store application 124 to the second external electronic device 102.

In an embodiment, the second external electronic device 102 may request an authentication certificate corresponding to the at least one second vehicle service 250 from the third external electronic device 301. The third external electronic device 301 may interwork with the second external electronic device 102 to transmit the authentication certificate 350 corresponding to the at least one second vehicle service 250 to the vehicle control device 100. For example, the third external electronic device 301 may transmit a signal 361 indicating the authentication certificate 350 to the vehicle control device 100.

In an embodiment, when not identifying the authentication certificate corresponding to the at least one second vehicle service 250, the third external electronic device 301 may request the authentication certificate corresponding to the at least one second vehicle service 250 from the fourth external electronic device 302.

In an embodiment, the fourth external electronic device 302 may generate the authentication certificate corresponding to the at least one second vehicle service 250 by means of the authentication certificate generator 330, in response to the request from the third external electronic device 301. For example, the fourth external electronic device 302 may generate an authentication certificate to be verified by a controller (e.g., the first controller 201 and/or the second controller 202) associated with the at least one second vehicle service 250. After generating the authentication certificate, the fourth external electronic device 302 may transmit the authentication certificate to the third external electronic device 301.

In an embodiment, the third external electronic device 301 may transmit the authentication certificate to the vehicle control device 100, based on the received authentication certificate from the fourth external electronic device 302.

The third external electronic device 301 may transmit the authentication certificate to the vehicle control device 100 between a first external electronic device (e.g., a first external electronic device 101 of FIG. 1) and the vehicle control device 100. The third external electronic device 301 may transmit the authentication certificate to the vehicle control device 100 without passing through the first external electronic device for performing an update.

The vehicle control device 100 according to an embodiment may activate the at least one second vehicle service 250 in the vehicle, based on receiving (or obtaining) the authentication certificate 350 from the third external electronic device 301. For example, the vehicle control device 100 may manage or verify the authentication certificate 350 by means of the controller (e.g., the first controller 201) associated with the at least one second vehicle service 250 among the plurality of controllers.

In an embodiment, the vehicle control device 100 may verify the authentication certificate 350 by means of the controller (e.g., the first controller 201). The vehicle control device 100 may identify user authentication and/or whether a user has authority over the at least one second vehicle service 250, based on the verified authentication certificate 350. When determining that the user has the authority over the at least one second vehicle service 250 by means of the authentication certificate, the vehicle control device 100 may activate the at least one second vehicle service 250.

For example, after obtaining the authentication certificate 350, the vehicle control device 100 may control the first controller 201 and/or the second controller 202 associated with the at least one second vehicle service 250, in response to an input for executing the at least one second vehicle service 250.

As described above, the vehicle control device 100 according an embodiment may obtain an authentication certificate associated with the at least one second vehicle service 250 from an authentication certificate generation server or an authentication certificate distribution server to activate the at least one second vehicle service 250 in the vehicle. The vehicle control device may perform verification for activating the at least one second vehicle service 250 by means of the controller (e.g., the first controller 201), based on the obtained authentication certificate. The vehicle control device 100 may activate the at least one second vehicle service 250, based on the completion of the verification. The vehicle control device 100 may strengthen security for the vehicle service and may maintain integrity for the vehicle service, by means of the verification for the authentication certificate.

Hereinafter, a description is given in detail of an operation of the vehicle control device according to an embodiment of the present disclosure with reference to FIG. 4.

Figure 4:
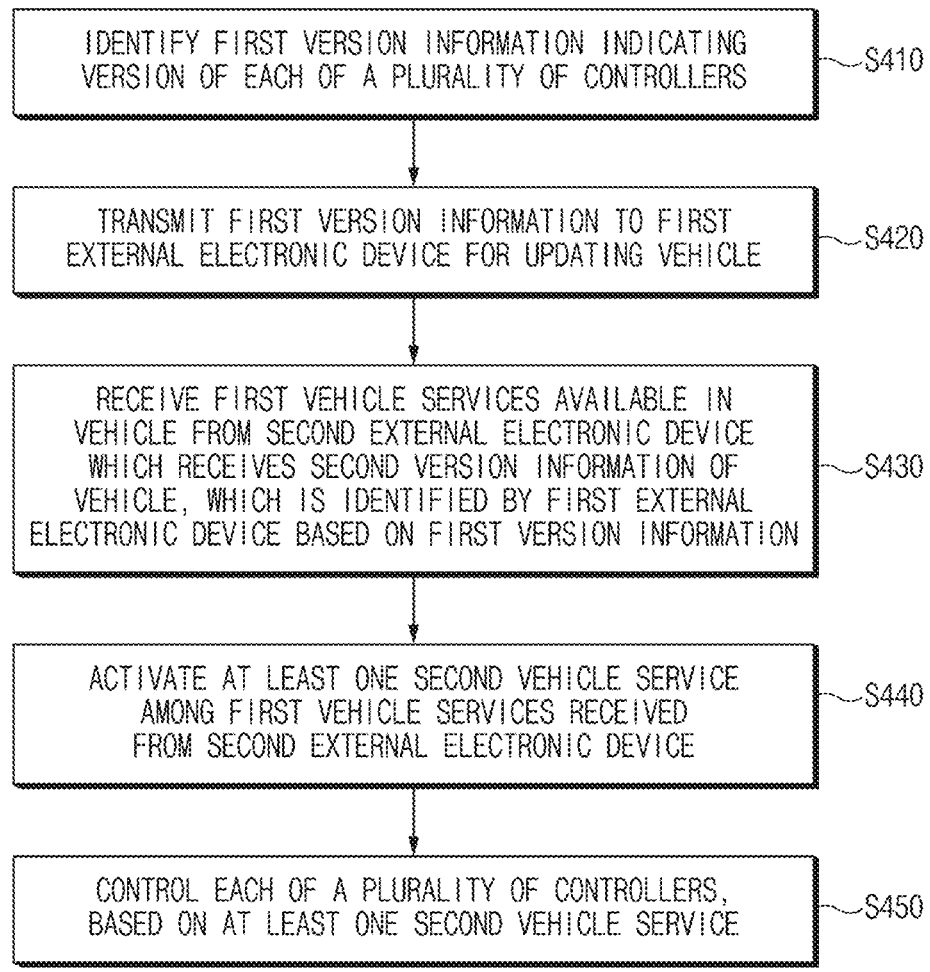
FIG. 4 illustrates an example of a flowchart indicating an operation of a vehicle control device according to an embodiment of the present disclosure.

FIG. 4 illustrates an example of a flowchart indicating an operation of a vehicle control device according to an embodiment of the present disclosure. Hereinafter, it is assumed that a vehicle control device 100 of FIG. 1 performs a process of FIG. 4. Furthermore, in a description of FIG. 4, an operation described as being performed by a device may be understood as being controlled by a processor 110 of the vehicle control device 100. The respective operations of FIG. 4 may be sequentially performed but are not necessarily sequentially performed. For example, an order of the respective operations may be changed, and at least two operations may be performed in parallel.

Referring to FIG. 4, in operation S410, the vehicle control method according to an embodiment may include identifying first version information indicating a version of each of a plurality of controllers. The first version information may indicate a combination of the versions of the plurality of controllers. The vehicle control method may include identifying the version of each of the plurality of controllers, after starting a vehicle.

Referring to FIG. 4, in operation S420, the vehicle control method according to an embodiment may include transmitting the first version information to a first external electronic device for updating the vehicle. The first external electronic device may be referred to a first external electronic device 101 of FIG. 1.

Referring to FIG. 4, in operation S430, the vehicle control method according to an embodiment may include receiving first vehicle services available in the vehicle from a second external electronic device. The second external electronic device receives second version information of the vehicle, which is identified by the first external electronic device based on the first version information. The second external electronic device may be referred to a second external electronic device 102 of FIG. 2. The first external electronic device may identify second version information indicating a version of the vehicle based on a mapping dataset (or a mapping table) using the first version information. The first external electronic device may transmit the second version information to the second external electronic device. The second external electronic device may identify the first vehicle services for supporting the second version information, using the second version information received from the first external electronic device.

Referring to FIG. 4, in operation S440, the vehicle control method according to an embodiment may include activating at least one second vehicle service among the first vehicle services received from the second external electronic device. For example, the vehicle control method may include receiving an authentication certificate corresponding to the at least one second vehicle service from a third external electronic device (e.g., a third external electronic device 301 of FIG. 3). The vehicle control method may include activating the at least one second vehicle service based on the completion of the verification for the authentication certificate.

Referring to FIG. 4, in operation S450, the vehicle control method according to an embodiment may include controlling each of the plurality of controllers, based on the at least one second vehicle service. The vehicle control method may include controlling a controller associated with the at least one second vehicle service among the plurality of controllers. The vehicle control method may include executing the at least one second vehicle service, after verifying the authentication certificate corresponding to the at least one second vehicle service, using the controller associated with the at least one second vehicle service.

Figure 5:
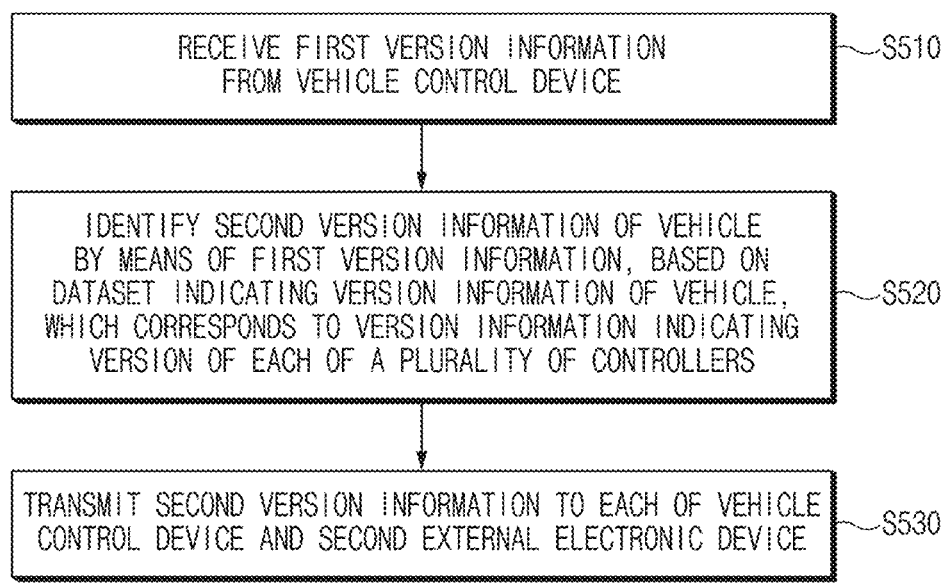
FIG. 5 illustrates an example of a flowchart indicating an operation of a first external electronic device of a vehicle control system according to an embodiment of the present disclosure.

FIG. 5 illustrates an example of a flowchart indicating an operation of a first external electronic device of a vehicle control system according to an embodiment of the present disclosure. Hereinafter, it is assumed that a first electronic device 101 of FIG. 1 performs a process of FIG. 5. Furthermore, in a description of FIG. 5, an operation described as being performed by a device may be understood as being controlled by a processor 110-1 of the first external electronic device 101. The respective operations of FIG. 5 may be sequentially performed but are not necessarily sequentially performed. For example, an order of the respective operations may be changed, and at least two operations may be performed in parallel.

Referring to FIG. 5, in operation S510, in an embodiment, a first external electronic device may receive first version information from a vehicle control device. The first version information may be referred to first version information 210 of FIG. 2.

Referring to FIG. 5, in operation S520, in an embodiment, the first external electronic device may identify second version information of a vehicle by means of the first version information, based on a dataset indicating version information of the vehicle, which corresponds to version information indicating a version of each of a plurality of controllers. The second version information may be referred to second version information 220 of FIG. 2.

Referring to FIG. 5, in operation S530, in an embodiment, the first external electronic device may transmit the second version information to the vehicle control device and a second external electronic device. In an embodiment, the first external electronic device may transmit the second version information to at least one of the vehicle control device, the second external electronic device, or any combination thereof. The second external electronic device may be referred to a second external electronic device 102 of FIG. 1. For example, the first external electronic device may notify a user of the vehicle control device of the second version information, based on the second version information transmitted to the vehicle control device. The first external electronic device may cause the second external electronic device to identify a vehicle service corresponding to the second version information, based on the second version information transmitted to the second external electronic device.

Figure 6:
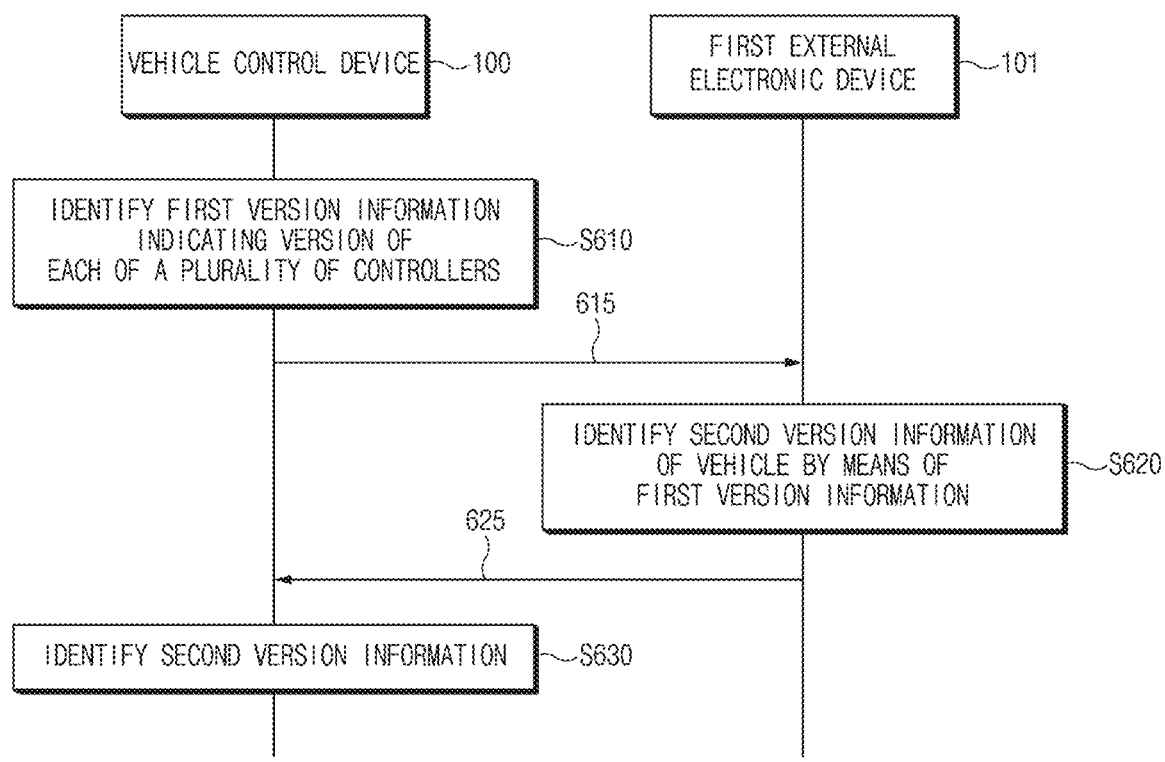
FIG. 6 illustrates an example of a signal sequence diagram between a vehicle control device and a first external electronic device according to an embodiment of the present disclosure.

FIG. 6 illustrates an example 601 of a signal sequence diagram between a vehicle control device and a first external electronic device according to an embodiment of the present disclosure. Hereinafter, it is assumed that a vehicle control device 100 of FIG. 1 or a first external electronic device 101 of FIG. 1 performs a process of FIG. 6. Furthermore, in a description of FIG. 6, an operation described as being performed by a device may be understood as being controlled by a processor 110 of the vehicle control device 100 and/or a processor 110-1 of the first external electronic device 101.

A vehicle control device 100 of FIG. 6 may be referred to the vehicle control device 100 of FIG. 1. A first external electronic device 101 of FIG. 6 may be referred to the first external electronic device 101 of FIG. 1. The vehicle control device 100 may wirelessly establish a communication link with the first external electronic device 101, using an OTA communication protocol.

Referring to FIG. 6, in operation S610, the vehicle control device 100 according to an embodiment may identify first version information indicating a version of each of a plurality of controllers. The vehicle control device 100 may identify the first version information after starting a vehicle. The vehicle control device according to an embodiment may transmit a signal 615 indicating the first version information to the first external electronic device 101.

Referring to FIG. 6, in operation S620, in an embodiment, the first external electronic device 101 may identify second version information of the vehicle by means of the first version information. The second version information may indicate a version of the vehicle. The first external electronic device 101 may identify the second version information by means of the first version information using a mapping dataset (e.g., a mapping dataset 125 of FIG. 1). In an embodiment, the first external electronic device 101 may transmit a signal 625 indicating the second version information to the vehicle control device 100.

Referring to FIG. 6, in operation S630, the vehicle control device 100 according to an embodiment may identify the second version information. For example, the vehicle control device 100 may display the second version information on its display. The vehicle control device 100 may notify a user of the version of the vehicle, based on the displayed second version information.

In an embodiment, the vehicle control device 100 may transmit a request for updating each of the plurality of controllers to the first external electronic device 101. The first external electronic device 101 may transmit update information for updating each of the plurality of controllers to the vehicle control device 100, in response to the request. The vehicle control device 100 may update each of the plurality of controllers, based on receiving the update information. The vehicle control device 100 may, by updating each of the plurality of controllers, update the version of the vehicle, which corresponds to the second version information, to another version of the vehicle. The other version of the vehicle is matched with the updated version of each of the plurality of controllers.

Figure 7:
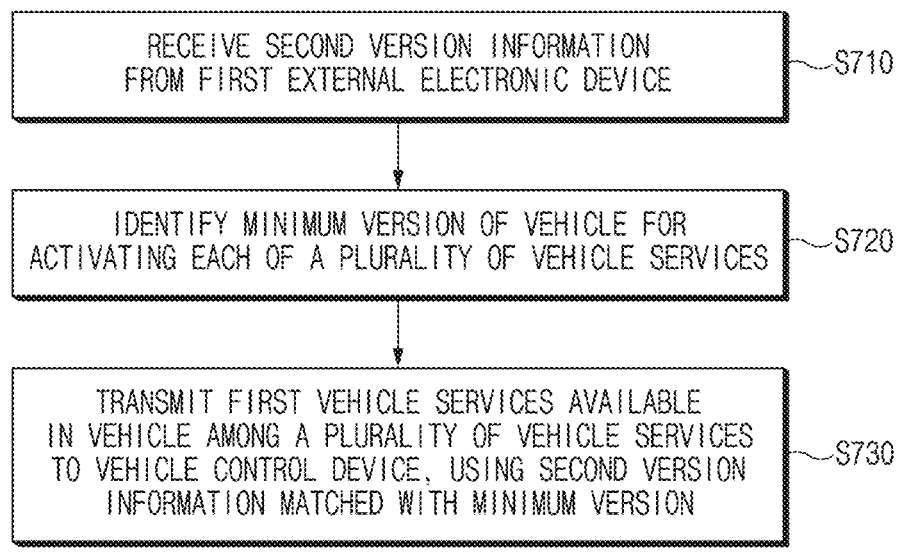
FIG. 7 illustrates an example of a flowchart indicating an operation of a second external electronic device of a vehicle control system according to an embodiment of the present disclosure.

FIG. 7 illustrates an example of a flowchart indicating an operation of a second external electronic device of a vehicle control system according to an embodiment of the present disclosure. Hereinafter, it is assumed that a second electronic device 102 of FIG. 1 performs a process of FIG. 7. Furthermore, in a description of FIG. 7, an operation described as being performed by a device may be understood as being controlled by a processor 110-2 of the second external electronic device 102. The respective operations of FIG. 7 may be sequentially performed but are not necessarily sequentially performed. For example, an order of the respective operations may be changed, and at least two operations may be performed in parallel. At least one of the operations of FIG. 7 may be associated with at least one of operations of FIGS. 4 and 5.

Referring to FIG. 7, in operation S710, in an embodiment, a second external electronic device may receive second version information from a first external electronic device. For example, after the first external electronic device performs operation S530 of FIG. 5, the second external electronic device may perform operation S710. For example, before receiving the second version information, the second external electronic device may register a plurality of vehicle services. For example, the second external electronic device may register information indicating a minimum version of a vehicle for executing the plurality of vehicle services together. The operation of registering at least one piece of information in the second external electronic device may include an operation of storing the at least one piece of information in a memory.

Referring to FIG. 7, in operation S720, in an embodiment, the second external electronic device may identify a minimum version of the vehicle for activating each of the plurality of vehicle services. The minimum version of the vehicle may indicate a version in which the plurality of vehicle services is executed in the vehicle. The plurality of vehicle services may be more stably executed than another vehicle with a version less than the minimum version of the vehicle, in a vehicle with a version greater than or equal to the minimum version of the vehicle (or higher than the minimum version of the vehicle).

Referring to FIG. 7, in operation S730, in an embodiment, the second external electronic device may transmit first vehicle services available in the vehicle among the plurality of vehicle services to a vehicle control device, using the second version information matched with the minimum version. The first vehicle services may be executed in the vehicle with a version greater than or equal to the second version information. For example, the vehicle control device may perform operation S440 of FIG. 4, based on receiving the first vehicle services (or a list of the first vehicle services).

Figure 8:
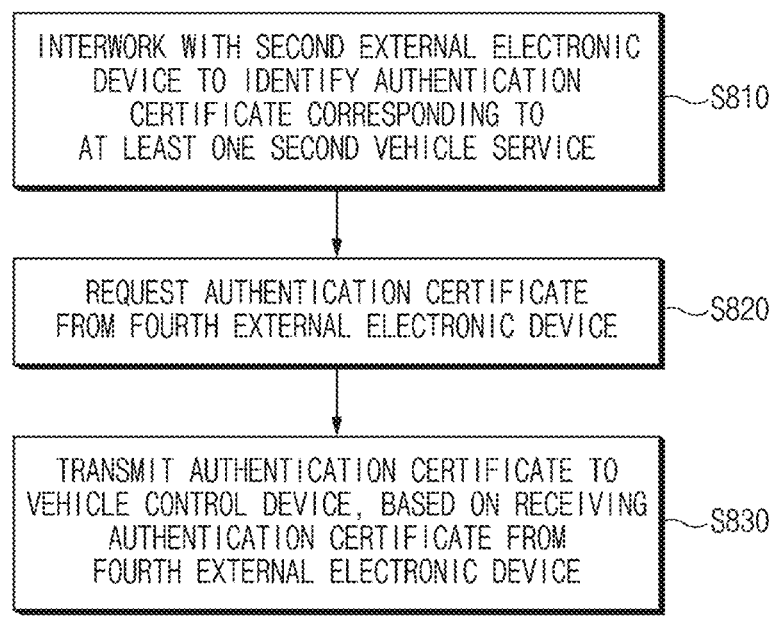
FIG. 8 illustrates an example of a flowchart indicating an operation of a third external electronic device of a vehicle control system according to an embodiment of the present disclosure.

FIG. 8 illustrates an example of a flowchart indicating an operation of a third external electronic device of a vehicle control system according to an embodiment of the present disclosure. Hereinafter, it is assumed that a third electronic device 301 of FIG. 3 performs a process of FIG. 8. Furthermore, in a description of FIG. 8, an operation described as being performed by a device may be understood as being controlled by a processor 310 of the third external electronic device 301. The respective operations of FIG. 8 may be sequentially performed but are not necessarily sequentially performed. For example, an order of the respective operations may be changed, and at least two operations may be performed in parallel. At least one of the operations of FIG. 8 may be associated with at least one of operations of FIG. 4.

Referring to FIG. 8, in operation S810, in an embodiment, a third external electronic device may interwork with a second external electronic device to identify an authentication certificate corresponding to at least one second vehicle service. For example, a vehicle control device may identify the at least one second vehicle service for being activated in a vehicle among first vehicle services received from the second external electronic device (e.g., a second external electronic device 102 of FIG. 1). The vehicle control device may identify the at least one second vehicle service in response to an input for activating the at least one second vehicle service. The vehicle control device may transmit a signal indicating the identified at least one second vehicle service to the second external electronic device. The second external electronic device may request an authentication certificate for activating the at least one second vehicle service from the third external electronic device. The third external electronic device may identify an authentication certificate corresponding to the at least one second vehicle service in response to the request received from the second external electronic device. In an embodiment, when identifying the authentication certificate, the third external electronic device may transmit the authentication certificate to the vehicle control device.

Referring to FIG. 8, in operation S820, in an embodiment, the third external device electronic may request the authentication certificate from a fourth external electronic device. In an embodiment, when not identifying the authentication certificate, the third external electronic device may request the authentication certificate from the fourth external electronic device. However, it is not limited thereto.

In an embodiment, the fourth external electronic device may generate the requested authentication certificate. The authentication certificate may be verified by means of a controller associated with the at least one second vehicle service.

Referring to FIG. 8, in operation S830, in an embodiment, the third external electronic device may transmit the authentication certificate to the vehicle control device, based on receiving the authentication certificate from the fourth external electronic device. The vehicle control device may manage the authentication certificate using a controller (e.g., a first controller 201 of FIG. 2) for executing the at least one second vehicle service, based on the received authentication certificate. The vehicle control device may activate the at least one second vehicle service, based on receiving the authentication certificate. The vehicle control device may perform operation S440 of FIG. 4, based on the received authentication certificate.

Figure 9:
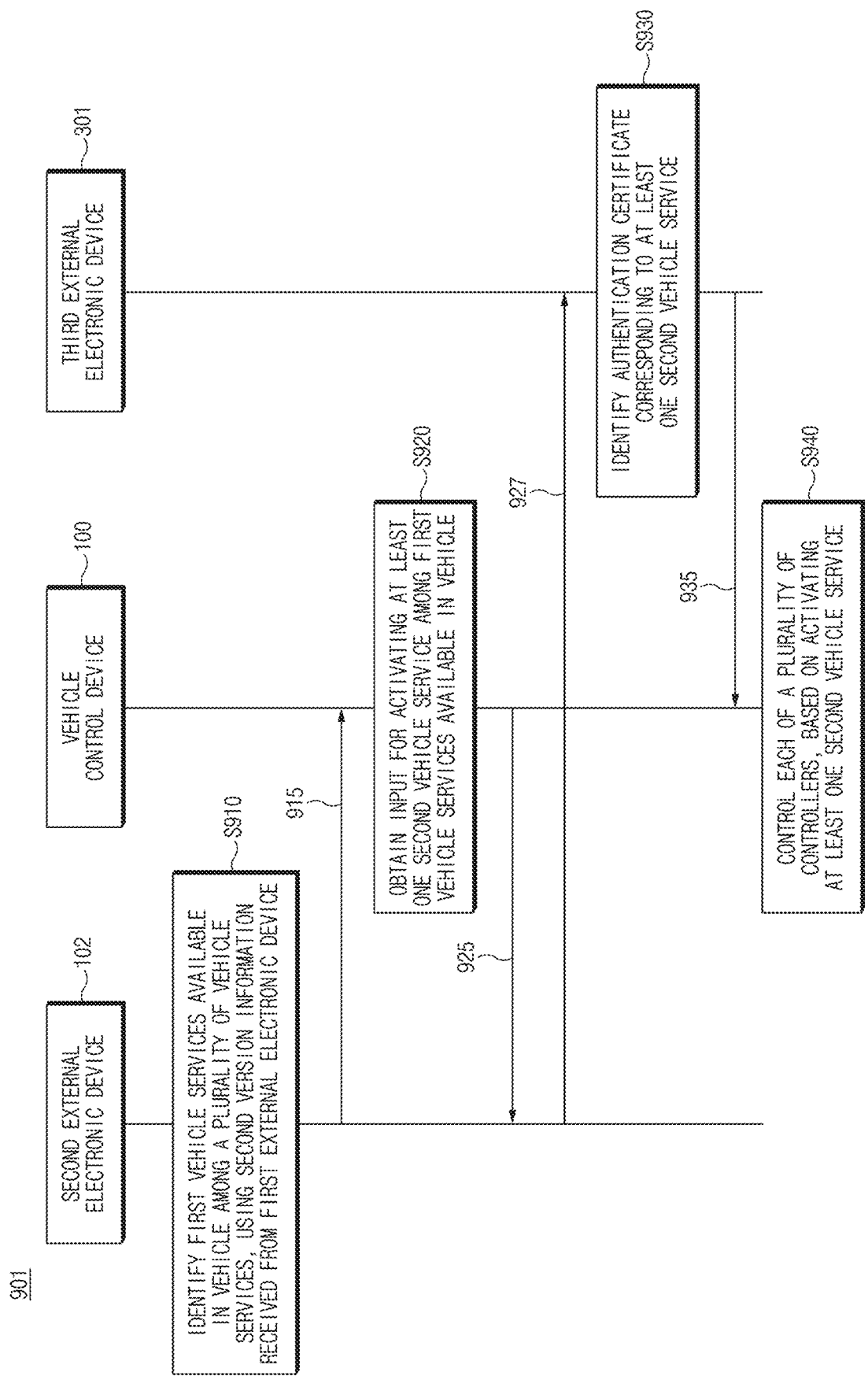
FIG. 9 illustrates an example of a signal sequence diagram between a vehicle control device and external electronic devices according to an embodiment of the present disclosure.

FIG. 9 illustrates an example 901 of a signal sequence diagram between a vehicle control device and external electronic devices according to an embodiment of the present disclosure. Hereinafter, it is assumed that a vehicle control device 100 of FIG. 1, a second external electronic device 102 of FIG. 1, and/or a third external electronic device 301 of FIG. 3 performs a process of FIG. 9. Furthermore, in a description of FIG. 9, an operation described as being performed by a device may be understood as being controlled by a processor 110 of the vehicle control device 100, a processor 110-2 of the second external electronic device 102, and/or a processor 310 of the third external electronic device 301. The respective operations of FIG. 9 may be sequentially performed but are not necessarily sequentially performed. At least one of the operations of FIG. 9 may be associated with at least one of operations of FIG. 4.

Referring to FIG. 9, in operation S910, in an embodiment, the second external electronic device 102 may identify first vehicle services available in a vehicle among a plurality of vehicle services, using second version information received from a first external electronic device. The second external electronic device 102 may identify the first vehicle services matched with the second version information among the plurality of vehicle services. The second external electronic device 102 may transmit a signal 915 indicating a list of the first vehicle services to a vehicle control device 100.

Referring to FIG. 9, in operation S920, based on the received signal 915, the vehicle control device 100 according to an embodiment may obtain an input for activating at least one second vehicle service among the first vehicle services available in the vehicle. The vehicle control device 100 may display the list of the first vehicle services, based on the execution of a store application (e.g., a store application 124 of FIG. 1). The vehicle control device 100 may obtain an input for the at least one second vehicle service included in the first vehicle services, based on the displayed list of the first vehicle services.

The vehicle control device 100 according to an embodiment may transmit a signal 925 indicating the at least one second vehicle service to the second external electronic device 102. In response to the signal 925, the second external electronic device 102 may transmit a signal 927 for requesting an authentication certificate corresponding to the at least one second vehicle service to the third external electronic device 301 to activate the at least one second vehicle service.

Referring to FIG. 9, in operation S930, in an embodiment, the third external electronic device 301 may identify an authentication certificate corresponding to the at least one second vehicle service. For example, after performing at least one of operations of FIG. 8, the third external electronic device 301 may perform operation S930. The third external electronic device 301 may request the authentication certificate corresponding to the at least one second vehicle service from a fourth external electronic device (e.g., a fourth external electronic device 302 of FIG. 3). The third external electronic device 301 may identify the authentication certificate corresponding to the at least one second vehicle service, based on the received authentication certificate from the fourth external electronic device. The third external electronic device 301 may transmit a signal 935 indicating the authentication certificate to the vehicle control device 100. The third external electronic device 301 may transmit the signal 935 to the vehicle control device 100 between the first external electronic device for updating the vehicle control device 100 and the vehicle control device 100

Referring to FIG. 9, in operation S940, the vehicle control device 100 according to an embodiment may control each of the plurality of controllers, based on activating the at least one second vehicle service. S940 may be associated with S450 of FIG. 4.

Figure 10:
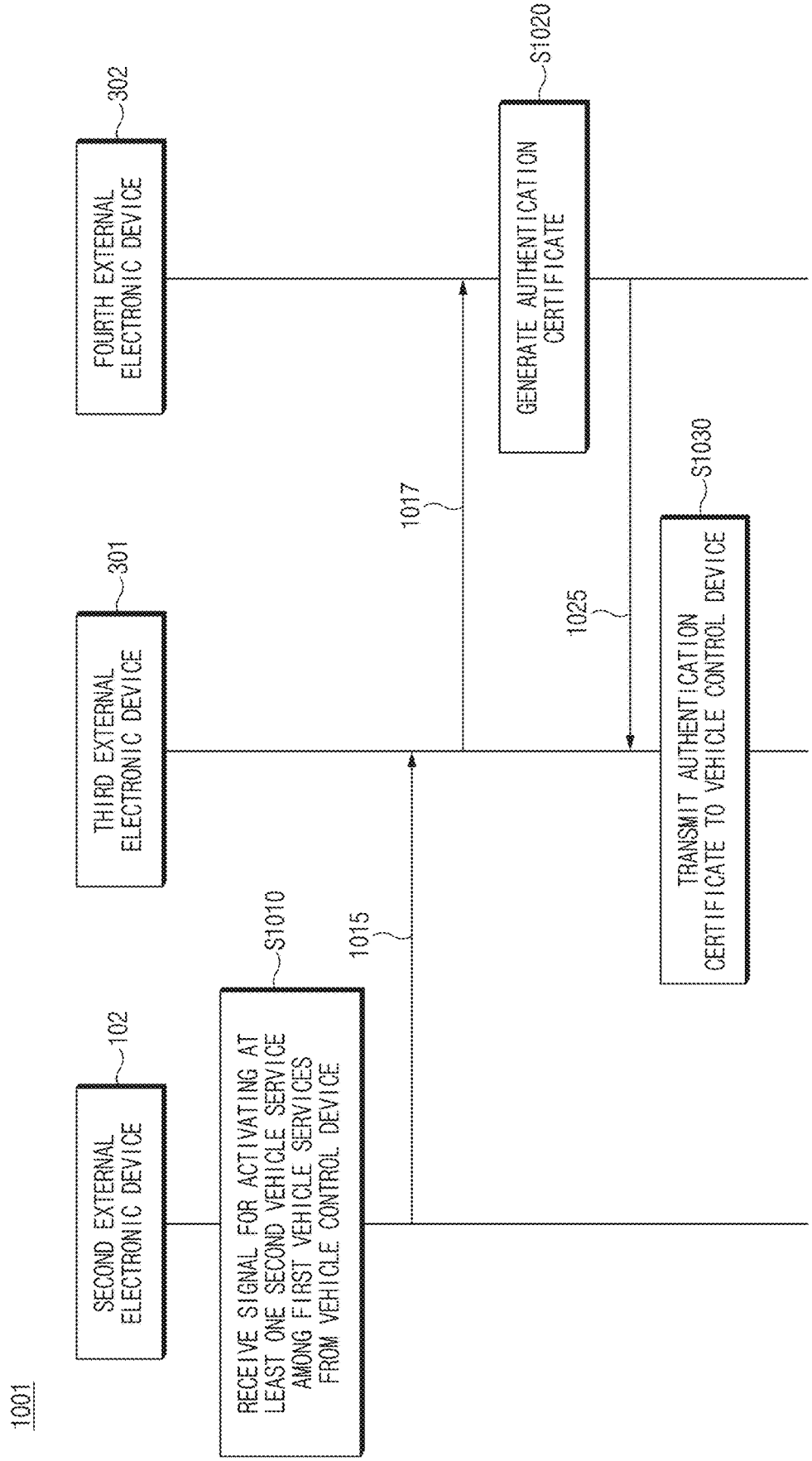
FIG. 10 illustrates an example of a signal sequence diagram between external electronic devices of a vehicle control system according to an embodiment of the present disclosure.

FIG. 10 illustrates an example 1001 of a signal sequence diagram between external electronic devices of a vehicle control system according to an embodiment of the present disclosure. Hereinafter, it is assumed that a second external electronic device 102 of FIG. 1, a third external electronic device 301 of FIG. 3, and a fourth external electronic device 302 of FIG. 3 performs a process of FIG. 10. Furthermore, in a description of FIG. 10, an operation described as being performed by a device may be understood as being controlled by a processor 110-2 of the second external electronic device 102, a processor 310 of the third external electronic device 301, and/or a processor 310-1 of the fourth external electronic device 302. The respective operations of FIG. 10 may be sequentially performed but are not necessarily sequentially performed. At least one of the operations of FIG. 10 may be associated with at least one of operations of FIG. 4.

Referring to FIG. 10, in operation S1010, in an embodiment, the second external electronic device 102 may receive a signal for activating at least one second vehicle service among first vehicle services from a vehicle control device. After receiving a signal 925 of FIG. 9, the second external electronic device 102 may perform operation S1010. In an embodiment, the second external electronic device 102 may transmit a signal 1015 for requesting an authentication certificate for the at least one second vehicle service to the third external electronic device 301.

In an embodiment, the third external electronic device 301 may transmit a signal 1017 for requesting the fourth external electronic device 302 to generate the authentication certificate, based on the received signal 1015.

In an embodiment, based on the received signal 1017, in operation S1020, the fourth external electronic device 302 may generate the authentication certificate. The authentication certificate may be verified by means of a controller (e.g., a first controller 201 of FIG. 2) associated with the at least one second vehicle service. The fourth external electronic device 302 may be associated with a provider, which manufactures the controller. The fourth external electronic device 302 may be associated with a provider, which distributes the at least one second vehicle service. However, it is not limited thereto. The fourth external electronic device 302 may transmit a signal 1025 indicating the generated authentication certificate to the third external electronic device 301.

Referring to FIG. 10, in operation S1030, in an embodiment, the third external electronic device 301 may transmit the authentication certificate to the vehicle control device. The vehicle control device may perform verification for the authentication certificate, based on the received authentication certificate. The vehicle control device may perform S440 of FIG. 4, based on the completion of the verification for the authentication certificate.

Figure 11:
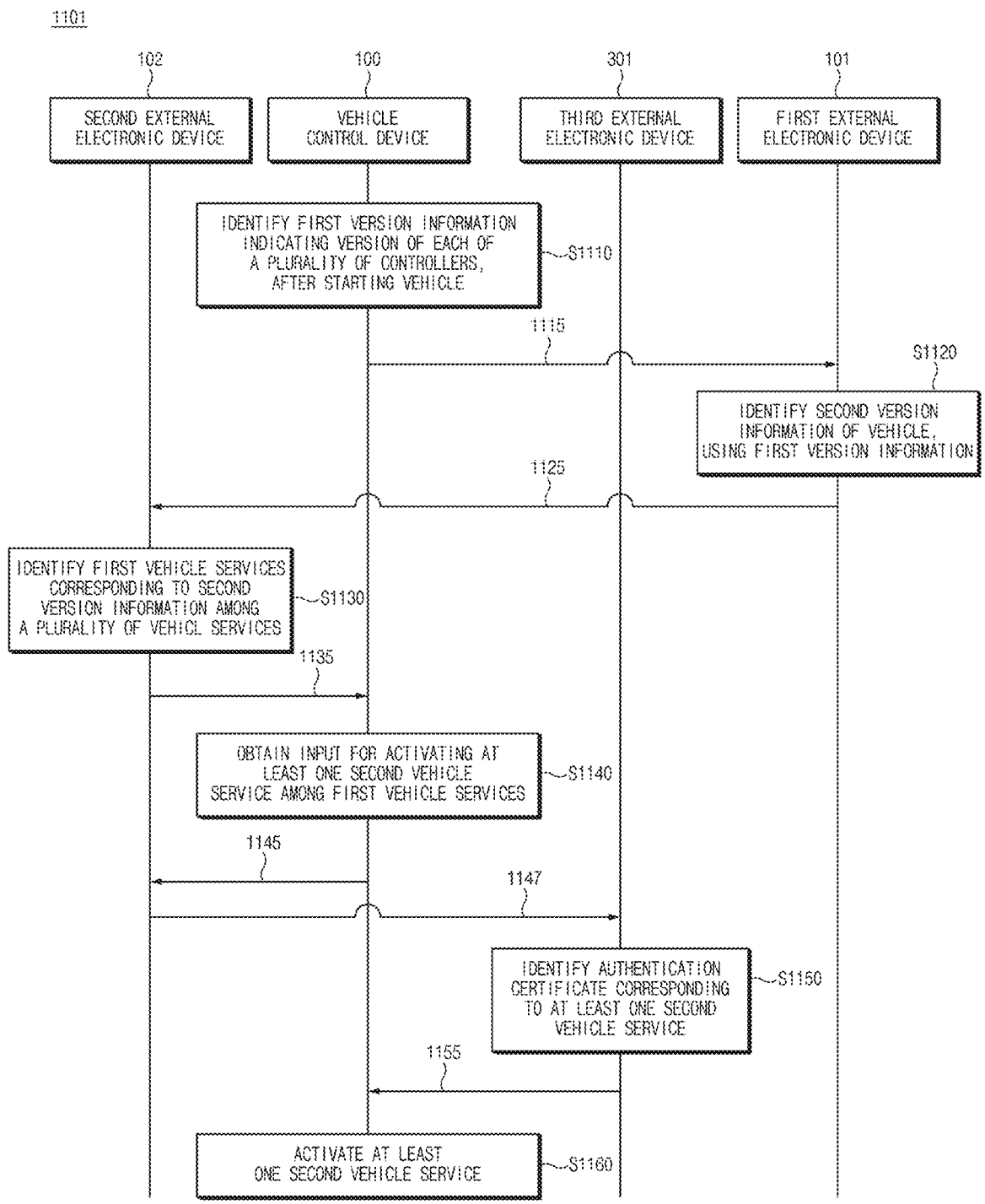
FIG. 11 illustrates an example of a signal sequence diagram between a vehicle control device and external electronic devices according to an embodiment of the present disclosure.

FIG. 11 illustrates an example 1101 of a signal sequence diagram between a vehicle control device and external electronic devices according to an embodiment of the present disclosure. The example 1101 may include a vehicle control system 105 of FIG. 1.

Referring to FIG. 11, in operation S1110, a vehicle control device 100 according to an embodiment may identify first version information indicating a version of each of a plurality of controllers, after starting a vehicle. The vehicle control device 100 may transmit a signal 1115 indicating the first version information to the first external electronic device 101.

In an embodiment, based on the received signal 1115, in operation S1120, the first external electronic device 101 may identify second version information of the vehicle using the first version information. The first external electronic device 101 may identify the second version information using a mapping dataset 125 of FIG. 1. The first external electronic device 101 may transmit a signal 1125 indicating the second version information to the second external electronic device 102.

In an embodiment, in operation S1130, the second external electronic device 102 may identify first vehicle services corresponding to the second version information among a plurality of vehicle services. The second external electronic device 102 may identify a minimum supportable version corresponding to the plurality of vehicle services and thus may identify the first vehicle services corresponding to the second version information. The second external electronic device 102 may transmit a signal 1135 indicating the first vehicle services (or a list of the first vehicle services) to the vehicle control device 100.

In operation S1140, the vehicle control device 100 according to an embodiment may obtain an input for activating at least one second vehicle service (e.g., a second vehicle service 250 of FIG. 2) among the first vehicle services. The vehicle control device 100 may obtain an input for activating the at least one second vehicle service, based on the execution of a store application. However, it is not limited thereto. As an example, the vehicle control device 100 may obtain the input from a user terminal. The vehicle control device 100 may transmit a signal 1145 indicating activating the at least one second vehicle service to the second external electronic device 102.

In an embodiment, the second external electronic device 102 may transmit a signal 1147 for requesting an authentication certificate corresponding to the at least one second vehicle service to the third external electronic device 301, based on receiving the signal 1145.

In an embodiment, based on the received signal 1147, in operation S1150, the third external electronic device 301 may identify the authentication certificate corresponding to the at least one second vehicle service. As an example, the third external electronic device 301 may obtain the authentication certificate corresponding to the at least one second vehicle service from a fourth external electronic device 302 of FIG. 3 and thus may perform operation S1150. For example, the third external electronic device 301 may transmit a signal 1155 indicating the authentication certificate to the vehicle control device 100.

In operation S1160, the vehicle control device 100 according to an embodiment may activate the at least one second vehicle service, based on receiving the signal 1155. After activating the at least one second vehicle service, the vehicle control device 100 may control a controller associated with the at least one second vehicle service in response to an input for executing the at least one second vehicle service.

Figure 12:
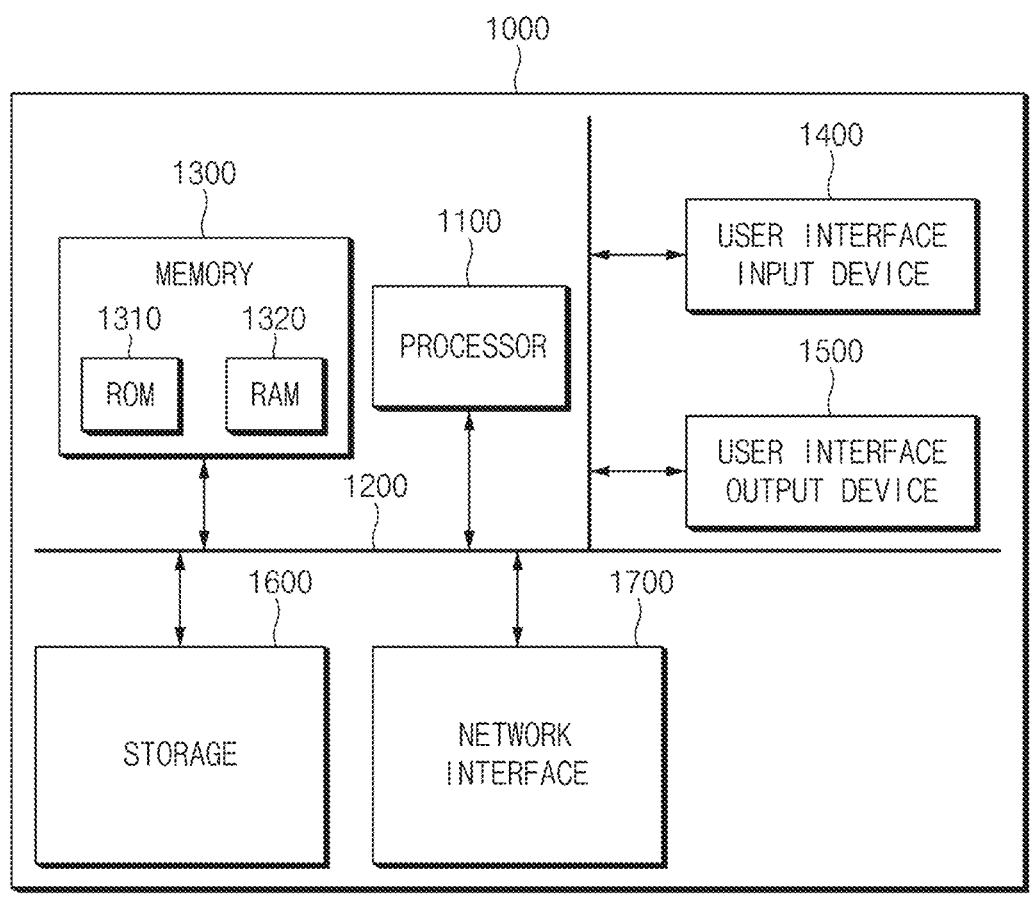
FIG. 12 illustrates a computing system associated with a vehicle control device according to an embodiment of the present disclosure.

FIG. 12 illustrates a computing system associated with a vehicle control device according to an embodiment of the present disclosure. Referring to FIG. 12, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM) (1320).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

The present technology may provide a vehicle service to a released vehicle.

The present technology may provide a vehicle service matched with a version of the vehicle.

Furthermore, the present technology may identify a supportable minimum version to match the vehicle service with the version of the vehicle.

In addition, various effects ascertained directly or indirectly through the present disclosure may be provided.

Hereinabove, although the present disclosure has been described with reference to embodiments and the accompanying drawings, the present disclosure is not limited thereto. The embodiments of the present disclosure may be variously modified and altered by those having ordinary skill in the art to which the present disclosure pertains without departing from the spirit and scope of the present disclosure claimed in the following claims.

Therefore, the embodiments of the present disclosure are provided to explain the spirit and scope of the present disclosure but not to limit them. The spirit and scope of the present disclosure are not limited by the embodiments. The scope of the present disclosure should be construed based on the accompanying claims, and all the technical ideas within the scope equivalent to the claims should be included in the scope of the present disclosure.

What is claimed is:

1. A vehicle control device, comprising:
a processor;
a memory; and
a plurality of controllers,
wherein the processor is configured to
identify first version information indicating a version of each of the plurality of controllers,
transmit the first version information to a first external electronic device for updating a vehicle,
receive a list of first vehicle services available in the vehicle from a second external electronic device configured to receive second version information identified by the first external electronic device based on the first version information, the second version information indicating a version of the vehicle,
activate at least one second vehicle service among the first vehicle services in the list received from the second external electronic device, and
control each of the plurality of controllers, based on the activated at least one second vehicle service, and
wherein the processor is further configured to
activate the at least one second vehicle service, based on an authentication certificate corresponding to the at least one second vehicle service, obtained from a third external electronic device, the third external electronic device configured to interwork with the second external electronic device and distribute authentication certificates for the first vehicle services.

2. The vehicle control device of claim 1, wherein the processor is configured to:
manage the authentication certificate, using a first controller associated with the at least one second vehicle service among the plurality of controllers, based on the obtained authentication certificate.

3. The vehicle control device of claim 2, wherein the processor is configured to:
control a second controller that is configured to provide the at least one second vehicle service together with the first controller, by means of the first controller that is configured to manage the authentication certificate, in response to an input for using the at least one second vehicle service.

4. The vehicle control device of claim 1, wherein the processor is configured to
identify the first version information indicating the version of each of the plurality of controllers, after a vehicle ignition is turned on.

5. The vehicle control device of claim 1, wherein the first vehicle services include a service corresponding to the second version information and not activated in the vehicle.

6. The vehicle control device of claim 1, wherein the processor is further configured to:
display the list of the first vehicle services based on execution of a store application interworking with the second external electronic device; and
activate the at least one second vehicle service, in response to an input for the at least one second vehicle service among the first vehicle services, based on the displayed list.

7. The vehicle control device of claim 1, wherein the processor is further configured to:
obtain time information indicating a time interval when the at least one second vehicle service is available, when activating the at least one second vehicle service; and
control each of the plurality of controllers during the time interval to activate the at least one second vehicle service.

8. The vehicle control device of claim 1, wherein the processor is further configured to:
update the version of the vehicle to another version indicating third version information different from the second version information by means of the first external electronic device, when downloading at least one fourth vehicle service among third vehicle services corresponding to the third version information; and activate the at least one fourth vehicle service, after the version of the vehicle is updated to the third version information.

9. The vehicle control device of claim 8, wherein the processor is further configured to:
perform an update for activating the at least one fourth vehicle service for the plurality of controllers, based on the third version information received from the first external electronic device.

10. A vehicle control system, comprising:
a vehicle control device configured to control a plurality of controllers;
a first external electronic device configured to update a vehicle including the vehicle control device; and
a second external electronic device configured to manage a plurality of vehicle services, wherein the vehicle control device is further configured to
identify first version information indicating a version of each of the plurality of controllers, and
transmit the first version information to the first external electronic device, wherein the first external electronic device is further configured to
obtain second version information indicating a version of the vehicle using the first version information received from the vehicle control device, and
transmit the second version information to at least one of the vehicle control device, the second external electronic device, or any combination thereof, and
wherein the second external electronic device is further configured to transmit first vehicle services available in the vehicle among the plurality of vehicle services to the vehicle control device, using the second version information received from the first external electronic device,
wherein the vehicle control system further comprises:
a third external electronic device configured to manage authentication certificates respectively corresponding to the plurality of vehicle services,
wherein the third external electronic device is further configured to interwork with the second external electronic device to transmit an authentication certificate corresponding to at least one second vehicle service to the vehicle control device, and
wherein the vehicle control device is further configured to activate the at least one second vehicle service in the vehicle, based on the authentication certificate received from the third external electronic device.

11. The vehicle control system of claim 10, wherein the vehicle control device is further configured to:
activate the at least one second vehicle service among the first vehicle services available in the vehicle, based on the first vehicle services available in the vehicle received from the second external electronic device; and
execute the at least one second vehicle service, using a controller associated with the at least one second vehicle service among the plurality of controllers, in response to an input for executing the activated at least one second vehicle service.

12. The vehicle control system of claim 10, wherein:
the second external electronic device is further configured to transmit third vehicle services corresponding to third version information distinct to the second version information among the plurality of vehicle services to the vehicle control device,
wherein the vehicle control device is further configured to activate at least one fourth vehicle service among the third vehicle services, and
wherein the first external electronic device is further configured to update a version of the vehicle to another version corresponding to the third version information to activate the at least one fourth vehicle service in the vehicle.

13. The vehicle control system of claim 10, further comprising:
a fourth external electronic device configured to generate the authentication certificates,
wherein the third external electronic device is further configured to
request the authentication certificate from the fourth external electronic device, and
transmit the authentication certificate to the vehicle control device, based on the authentication certificate received from the fourth external electronic device, and
wherein the vehicle control device is further configured to manage the authentication certificate by means of a controller associated with the at least one second vehicle service among the plurality of controllers.

14. The vehicle control system of claim 10, wherein the third external electronic device is further configured to:
transmit the authentication certificate to the vehicle control device between the first external electronic device and the vehicle control device.

15. The vehicle control system of claim 10, wherein the first external electronic device is further configured to:
obtain the second version information by means of the first version information, based on a dataset indicating version information of the vehicle, the version information corresponding to the first version information indicating the version of each of the plurality of controllers.

16. The vehicle control system of claim 10, wherein:
the second external electronic device is further configured to transmit the first vehicle services available in the vehicle to the vehicle control device, based on execution of a store application by the vehicle control device, and
wherein the store application includes a user interface for purchasing the plurality of vehicle services.

17. The vehicle control system of claim 10, wherein the second external electronic device is further configured to:
identify a minimum version of the vehicle for activating each of the plurality of vehicle services; and
transmit the first vehicle services available in the vehicle, using the second version information matched with the minimum version.

18. A computer-readable storage medium storing one or more programs, the one or more programs comprising instructions, when executed by a processor of an electronic device, causing the electronic device to:
receive, from an external electronic device, second version information identified based on first version information indicating a version of each of a plurality of controllers included in a vehicle, the second version information indicating a version of the vehicle;
identify a minimum version required to execute each of a plurality of vehicle services;
identify first vehicle services corresponding to the minimum version matched with the second version information among the plurality of vehicle services; and activate at least one second vehicle service, based on an authentication certificate corresponding to the at least one second vehicle service, obtained from a third external electronic device, the third external electronic device configured to interwork with a second external electronic device and distribute authentication certificates for the first vehicle services.

* * * * *